(12) United States Patent
Nomura et al.

(10) Patent No.: US 11,455,438 B2
(45) Date of Patent: Sep. 27, 2022

(54) METHODS FOR TOPOLOGY OPTIMIZATION USING A MEMBERSHIP VARIABLE

(71) Applicants: Toyota Motor Engineering & Manufacturing North America, Inc., Plano, TX (US); The Regents of the University of Michigan, Ann Arbor, MI (US)

(72) Inventors: Tsuyoshi Nomura, Novi, MI (US); Kazuhiro Saitou, Ann Arbor, MI (US); Yuqing Zhou, Ann Arbor, MI (US)

(73) Assignees: Toyota Motor Engineering & Manufacturing North America, Inc., Plano, TX (US); The Regents of the University of Michigan, Ann Arbor, MI (US)

( * ) Notice: Subject to any disclaimer, the term of this patent is extended or adjusted under 35 U.S.C. 154(b) by 968 days.

(21) Appl. No.: 16/163,950

(22) Filed: Oct. 18, 2018

(65) Prior Publication Data
US 2019/0236220 A1    Aug. 1, 2019

Related U.S. Application Data

(60) Provisional application No. 62/624,974, filed on Feb. 1, 2018.

(51) Int. Cl.
*G06F 30/20* (2020.01)
*G06F 111/04* (2020.01)

(52) U.S. Cl.
CPC .......... *G06F 30/20* (2020.01); *G06F 2111/04* (2020.01)

(58) Field of Classification Search
CPC .............. G06F 30/20; G06F 2111/04
(Continued)

(56) References Cited

U.S. PATENT DOCUMENTS

2015/0103698 A1    4/2015    Chakravarty et al.

FOREIGN PATENT DOCUMENTS

| CN | 101814103 | 8/2010 |
| CN | 103412987 | 11/2013 |

(Continued)

OTHER PUBLICATIONS

Nomura, Tsuyoshi, et al. "Topology Optimization Method with Vector Field Design Variables." R&D Rev Toyota CRDL 47.1 (2016). pp. 67-75. (Year: 2016).*

(Continued)

*Primary Examiner* — John E Johansen
(74) *Attorney, Agent, or Firm* — Dinsmore & Shohl LLP

(57) ABSTRACT

Methods for multi-component topology optimization for composite structures are disclosed. In one embodiment, a method of designing a structure by computer-implemented topology optimization includes establishing a plurality of design points within a design domain and establishing at least a first orientation field and a second orientation field. The method further includes assigning values for the one or more membership fields, the one or more density fields, the first orientation field and the second orientation field, and projecting the values onto a simulation model. The method includes achieving convergence of an objective function for a design variable by iteratively executing a topology optimization of the simulation model using the values. Each design point of the plurality of design points is a member of no component or a member of one of the first component and the second component.

20 Claims, 18 Drawing Sheets

(58) Field of Classification Search
USPC .................................................. 706/6; 703/6
See application file for complete search history.

(56) References Cited

FOREIGN PATENT DOCUMENTS

| CN | 103488813 | 1/2014 |
|---|---|---|
| CN | 103425832 | 6/2016 |
| CN | 107357974 | 11/2017 |
| CN | 107577837 | 1/2018 |

OTHER PUBLICATIONS

Guirguis, David, et al. "Multi-objective topology optimization of multi-component continuum structures via a Kriging-interpolated level set approach." Structural and Multidisciplinary Optimization 51.3 (2015). pp. 733-748. (Year: 2015).*
Sigmund, Ole, and Salvatore Torquato. "Design of smart composite materials using topology optimization." Smart Materials and Structures 8.3 (1999). pp. 365-379. (Year: 1999).*
Wang, Michael Yu, and Xiaoming Wang. ""Color" level sets: a multi-phase method for structural topology optimization with multiple materials." Computer Methods in Applied Mechanics and Engineering 193.6-8 (2004). pp. 469-496. (Year: 2004).*
Simultaneous optimization of topology and orientation of anisotropic material using isoparametric projection method, http://web.aeromech.usyd.edu.au/WCSMO2015/papers/1304_paper.pdf, Tsuyoshi Nomura et al., 11th World Congress on Structural and Multidisciplinary Optimization, Jun. 2015.
A survey of manufacturing oriented topology optimization methods, https://www.researchgate.net/publication/305902757_A_survey_of_manufacturing_oriented_topology_optimization_methods, Jikai Liu et al., Advances in Engineering Software, Aug. 2016.
Topology optimization of multiple anisotropic materials, with application to self-assembling diblock copolymers, https://arxiv.org/pdf/1711.10784.pdf, F. Regazzoni et al., Nov. 29, 2017.
Yuqing Zhou et al., "Multi-component topology and material orientation design of composite structures (MTO-C)", Computer Methods in Applied Mechanics and Engineering, vol. 342, Aug. 11, 2018, pp. 438-457.
Tsuyoshi Nomura et al., "General topology optimization method with continuous and discrete orientation design using isoparametric projection: Topology and Orientation Design Using Isoparametric Projection," International Journal of Numerical Methods in Engineering, vol. 101, No. 8, Dec. 12, 2014, pp. 571-605.
Christian Frier Hvejsel et al., "Material interpolation schemes for unified topology and multi-material optimization," Structural and Multidisciplinary Optimization, Springer, Berlin, De, vol. 43, No. 6, Jan. 27, 2011, pp. 811-825.
Zhou K et al., "Topology optimization of structures under multiple load cases using a fiber-reinforced composite material model," Computation Mechanics; Solids, Fluids, Engineered Materials, Aging Infrastructure, Molecular Dynamics, Heat Transfer, Manufacturing Processes, Optimization, Fracture & Integrity, Springer, Berlin, DE, vol. 38, No. 2, Jul. 1, 2006, pp. 163-170.
PCT Application No. PCT/US2019/015968, Notification of Transmittal of The International Search Report and The Written Opinion of the International Search Authority; Written Opinion of the International Searching Authority, dated Apr. 5, 2019.

* cited by examiner

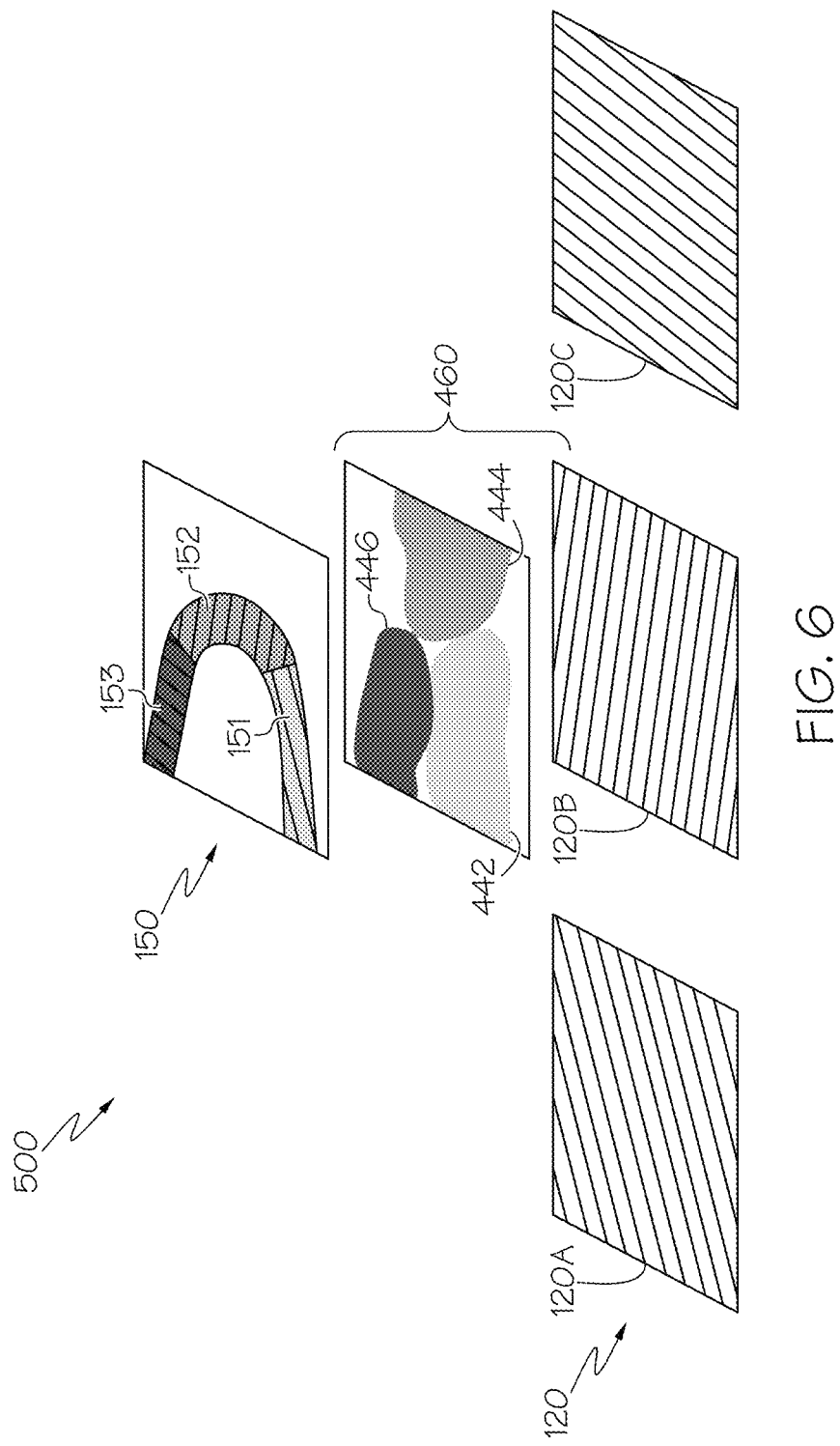

METHODS FOR TOPOLOGY OPTIMIZATION USING A MEMBERSHIP VARIABLE

CROSS-REFERENCE TO RELATED APPLICATIONS

This application claims priority to U.S. Provisional Patent Application No. 62/624,974 entitled "Multi-component Structural Optimization for Composite Material" and filed on Feb. 1, 2018, which is hereby incorporated by reference in its entirety.

TECHNICAL FIELD

The present specification generally relates to methods for topology optimization and, more particularly, multi-component structural topology optimization for composite materials.

BACKGROUND

Computer aided engineering analysis, for example, topology optimization techniques such as finite element models (FEM), incorporate computational techniques that are used to find approximate solutions to engineering problems. Motivated by the recent advent of composite manufacturing processes (e.g., variable axis composite), effort has been made to develop topology optimization methods for designing anisotropic material orientations. Based on their mathematical formulations, the existing methods can be categorized into two major classes: the discrete orientation method and the continuous orientation method.

The first class optimizes the material orientations among a prescribed set of alternative discrete angles, hence termed the discrete orientation method. However, discrete orientation methods suffer from a common issue: the need of a prescribed set of alternative discrete angles as an input. While, in theory, a set of infinitely large number of alternative discrete angles can contain the true optimal angles, the methods are limited to finding the best angles only among the given alternatives, which may well be suboptimal. In addition, while some extensions intend to address the selection of different angles for each substructure (typical for multi-panel construction of composite structures), the boundaries between substructures are simply determined by the prescribed division of the design domain, typically squares, without optimization processes.

The second class optimizes the material orientation within a continuous range of angles, not among alternative discrete angles, hence termed the continuous orientation method. Continuous fiber angle optimization (CFAO) methods where the orientation angles are regarded as continuous design variables that can take range $[0, 2\pi]$. While intuitive, this angular representation suffers from the convergence to the local minima due to the periodic nature of material properties with respect to the orientation angles. Additionally, the continuous orientation method may lead to designs having high manufacturing cost due to the many possible angles of fibers.

Accordingly, a need exists for alternative methods for topology optimization methods for structures with tailored material orientations.

SUMMARY

In one embodiment, a method of designing a structure by computer-implemented topology optimization includes establishing, by one or more processors, a plurality of design points within a design domain and establishing, by the one or more processors, at least a first orientation field and a second orientation field, wherein values of the first orientation field and the second orientation field correspond to an orientation angle of an element, one or more membership fields, wherein the one or more membership fields is associated with membership within a first component of the structure and a second component of the structure, and one or more density fields. The method further includes assigning, for each individual design point of the plurality of design points, values for the one or more membership fields, the one or more density fields, the first orientation field and the second orientation field, and projecting the values onto a simulation model. The method also includes achieving convergence of an objective function for a design variable by iteratively executing a topology optimization of the simulation model using the values, wherein convergence results in design of the structure, and each design point of the plurality of design points is a member of no component or a member of one of the first component and the second component.

In another embodiment, a method of designing a structure by computer-implemented topology optimization including establishing, by one or more processors, a plurality of design points within a design domain, and establishing, by the one or more processors: at least a first membership field and a second membership field, wherein the first membership field is associated with membership within a first component of the structure and the second membership field is associated within membership within a second component of the structure, at least a first density field and a second density field, and at least a first orientation field and a second orientation field, wherein values of the first orientation field and the second orientation field correspond to an orientation angle of an element. The method further includes assigning, for each individual design point of the plurality of design points, values for the first membership field, the second membership field, the first density field, the second density field, the first orientation field and the second orientation field, and projecting the values onto a simulation model. The method also includes achieving convergence of an objective function for a design variable by iteratively executing a topology optimization of the simulation model using the values, wherein convergence results in design of the structure, and each design point of the plurality of design points is a member of no component or a member of one of the first component and the second component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6 schematically depicts an example design field setup having a common membership and density field for a multi-component optimization method according to one or more embodiments described and illustrated herein;

DETAILED DESCRIPTION

Figure 1:
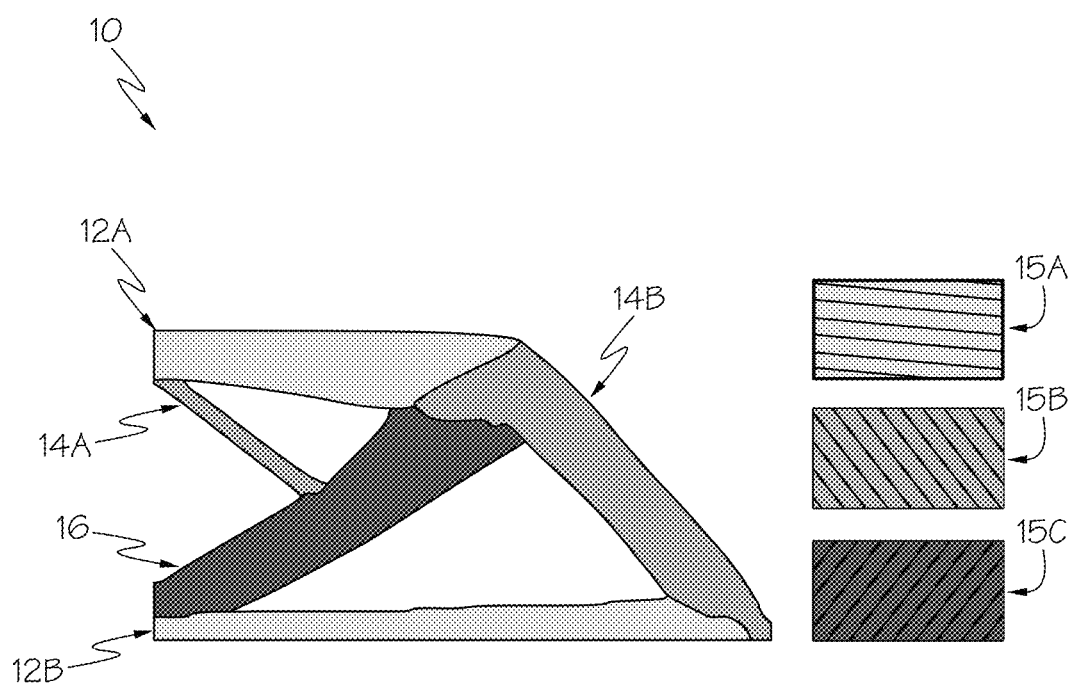
FIG. 1 schematically depicts an example multi-component structure designed by an example topology optimization method according to one or more embodiments described and illustrated herein.

Referring generally to the appended figures, embodiments of the present disclosure are directed to computer-implemented topology optimization methods for structures made of multiple composite components (i.e., substructures) with tailored material orientations. The methods described herein are capable of simultaneously optimizing the overall topology of the structure, component partitioning, and material orientation for each component, via a vector field variable that specifies fractional membership to each component, together with density and orientation variables. The convergence towards the non-fractional, zero/one membership during optimization is achieved by a cube-to-simplex projection of the membership variables with a penalization scheme. Through the integration with a continuous material orientation design method, the proposed methods are capable of generating multi-component composite structures with tailored material orientations for each component, without a prescribed set of alternative discrete angles. Embodiments introduce the concept of components (i.e., substructures) with the component-level orientation control, which is suitable for economical production with the conventional high-volume composite manufacturing processes.

Recent societal demand for energy saving has prompted increased emphasis on lightweight structural design. While the utilization of fiber reinforced composite materials can dramatically cut down structural weight, a significant trade-off exists between the production cost and structural performance.

Variable axial composite (VAC) is a class of composite materials reinforced by long fibers with varying orientations, produced by advanced manufacturing processes such as automated tape layout (ATL), tailored fiber placement (TFP), and continuous fiber printing (CFP). Generally, manufacturing processes with higher freedom in orientation control can produce higher performing composites, but cost more than those with lower freedom in orientation control. For this reason, conventional fixed-axis composites, despite their inferior performance, are widely adopted in many commercial applications, especially for large-scale and mass-produced structural products.

Embodiments described herein employ multi-component topology optimization (MTO). MTO is motivated by the need of generating ready-to-manufacture optimal structures made as assemblies of multiple components, each of which conforms geometric constraints imposed by a chosen manufacturing process.

Through the integration of a continuous material orientation design method within the MTO framework, embodiments described herein are capable of generating multi-component composite structures with tailored material orientations for each component without a prescribed set of alternative discrete angles. The resolution of the material orientation for each component can be controlled seamlessly from unidirectional to curvilinear and to general variable axis by changing an allowable variation. The methods described herein extend the continuous material orientation design methods by introducing the concept of components (i.e., substructures) with the component-level orientation control, which is suitable for economical production using conventional high-volume composite manufacturing processes.

Referring now to FIG. 1, a resulting structure 10 designed by the topology optimization methods described herein is schematically illustrated. The structure 10 comprises three components each have a resulting orientation angle of elements (e.g., fibers) and material density. First components 12A, 12B have fibers with an orientation angle as illustrated by inset 15A, second components 14A, 14B have fibers with an orientation angle as illustrated by inset 15B, and third component 16 have fibers with an orientation angle as illustrated by inset 15C.

The structure 10 illustrated by FIG. 1 was designed by topology optimization using membership variables. The membership variable, which is projected onto a simulation module, describes which component a design point within the design domain belongs to. The membership variable enables optimization of decomposition of a structure without prescribed partitioning. Thus, the partitioning is performed by the optimization process itself.

As an example and not a limitation, the membership variable has three design fields. It should be understood that more or fewer design fields may be utilized depending on the design parameters (e.g., one or more additional design fields). In a non-limiting example, the design fields may include a membership field, a density field, and an orientation field. If a structure is going to be a part having three components, such as the structure 10 illustrated by FIG. 1, the optimization method may have three membership fields, three density fields and three orientation fields.

Figure 2:
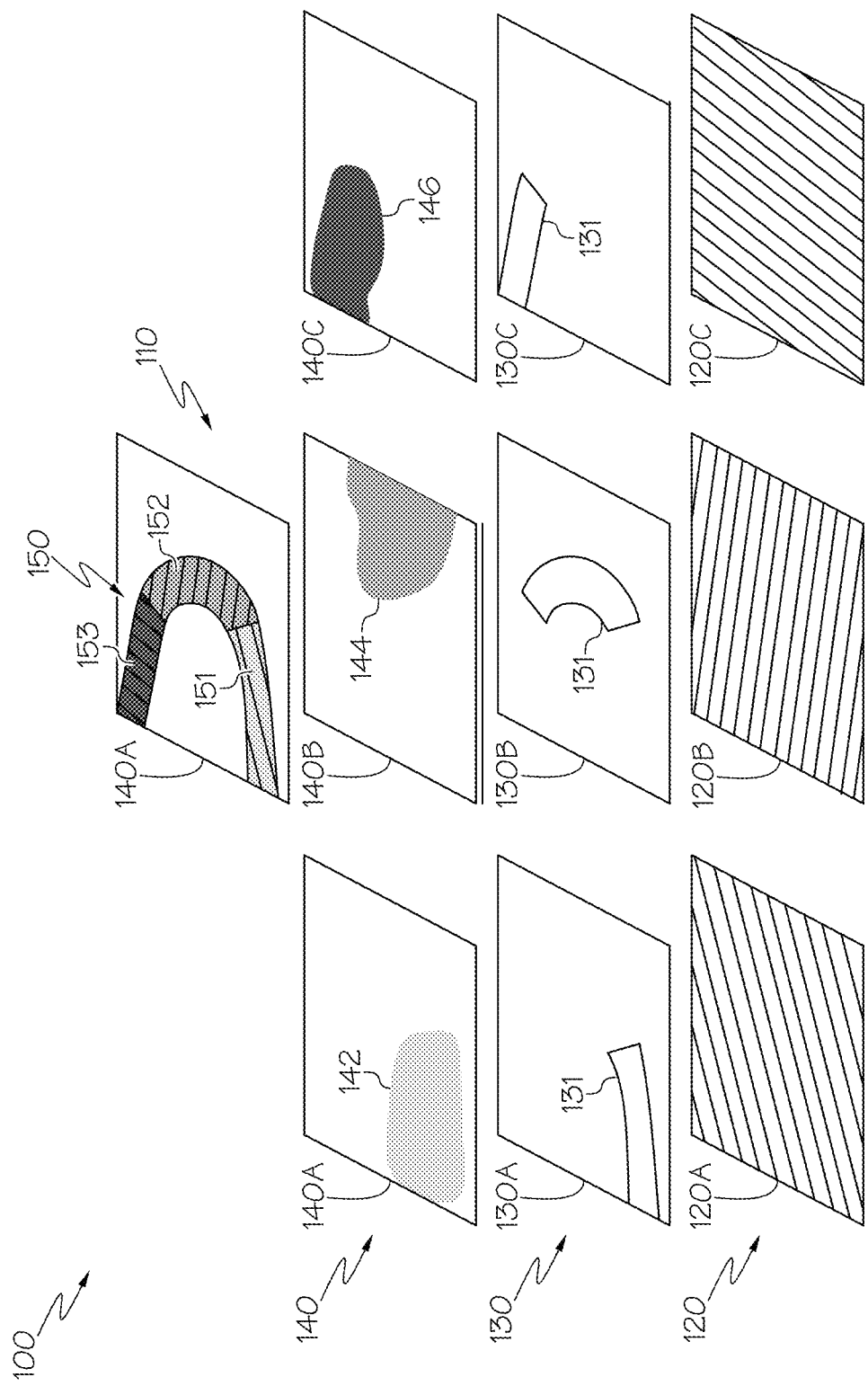
FIG. 2 schematically depicts an example design field setup for a multi-component optimization method according to one or more embodiments described and illustrated herein.

Referring now to FIG. 2, an example design field setup 100 comprising three layers for a topology optimization to design a structure having three components is schematically illustrated. The membership field layer 140 includes a first membership field 140A, a second membership field 140B, and a third membership field 140C. The density field layer 130 includes a first density field 130A, a second density field 130B and a third density field 130C. As shown in FIG. 2, density information 131 is provided by the first, second and third density fields 130A-130C. The orientation field layer 120 includes a first orientation field 120A, a second orientation field 120B and a third orientation field 120C, each of which includes material orientation information. Information of these design fields is projected onto a simulation model 110, which results in a structure having a first component 151, a second component 152 and a third component 153 following topology optimization.

The membership field layer 140 $m^{(k)}$ represents the fractional membership of each design point in the design domain of the simulation model to component k, where k=1, 2, ..., K and K is the prescribed maximum allowable number of components. In the example of FIG. 2, K=3. The density field layer 130 $\rho^{(k)}$ represents the material density of each design point, i.e., the overall topology of a structure in component k. The orientation field layer 120 $\vartheta^{(k)}=(\varsigma^{(k)}, \zeta^{(k)})$ is a Cartesian vector representing the orientation of each design point in component k. Depending on the radius of the regularization filter applied to the material orientation field, the resulting material orientation for each component can either be unidirectional or curvilinear. In the example of FIG. 2, the material orientation is unidirectional.

As described in more detail below, the design information for each field is projected to the simulation model filtered (i.e., multiplied) by its membership variable. For instance, information of the first orientation field 120A is projected only where the first membership field 140A is active (i.e., where $m^{(1)}=1$).

In this design field setup, the membership field should be converted in a mutually exclusive manner. That is, at each design point, one of the membership fields should be active (e.g., equal to one) while the other membership fields should be inactive (e.g., equal to zero), or all membership fields should be inactive.

As shown in FIG. 2, orientation information of the first orientation field 120A and density information of the first density field 130A is filtered by the first membership field 140A (region 142 is where design points of the first membership field 140A is equal to one) to yield a first component 151 in the structure 150 of the simulation model 110. Similarly, orientation information of the second orientation field 120B and density information of the second density field 130B is filtered by the second membership field 140B (region 144 is where design points of the second membership field 140B is equal to one) to yield a second component 152 in the structure 150 of the simulation model 110. Orientation information of the third orientation field 120C and density information of the third density field 130C is filtered by the third membership field 140C (region 146 is where design points of the third membership field 140C is equal to one) to yield a third component 153 in the structure 150 of the simulation model 110.

At initialization, orientation angles for the orientation fields 120A-120C are randomly selected. Similarly, density information for the density fields 130A-130C is randomly selected. A topology optimization method (e.g., a (mite element method) is performed and an objective function to minimize a design variable (e.g., compliance of the structure) is evaluated. The values for the membership fields 140A-140C, the orientation fields 120A-120C and the density fields 130A-130C are established when the design variable is minimized.

Figure 3:
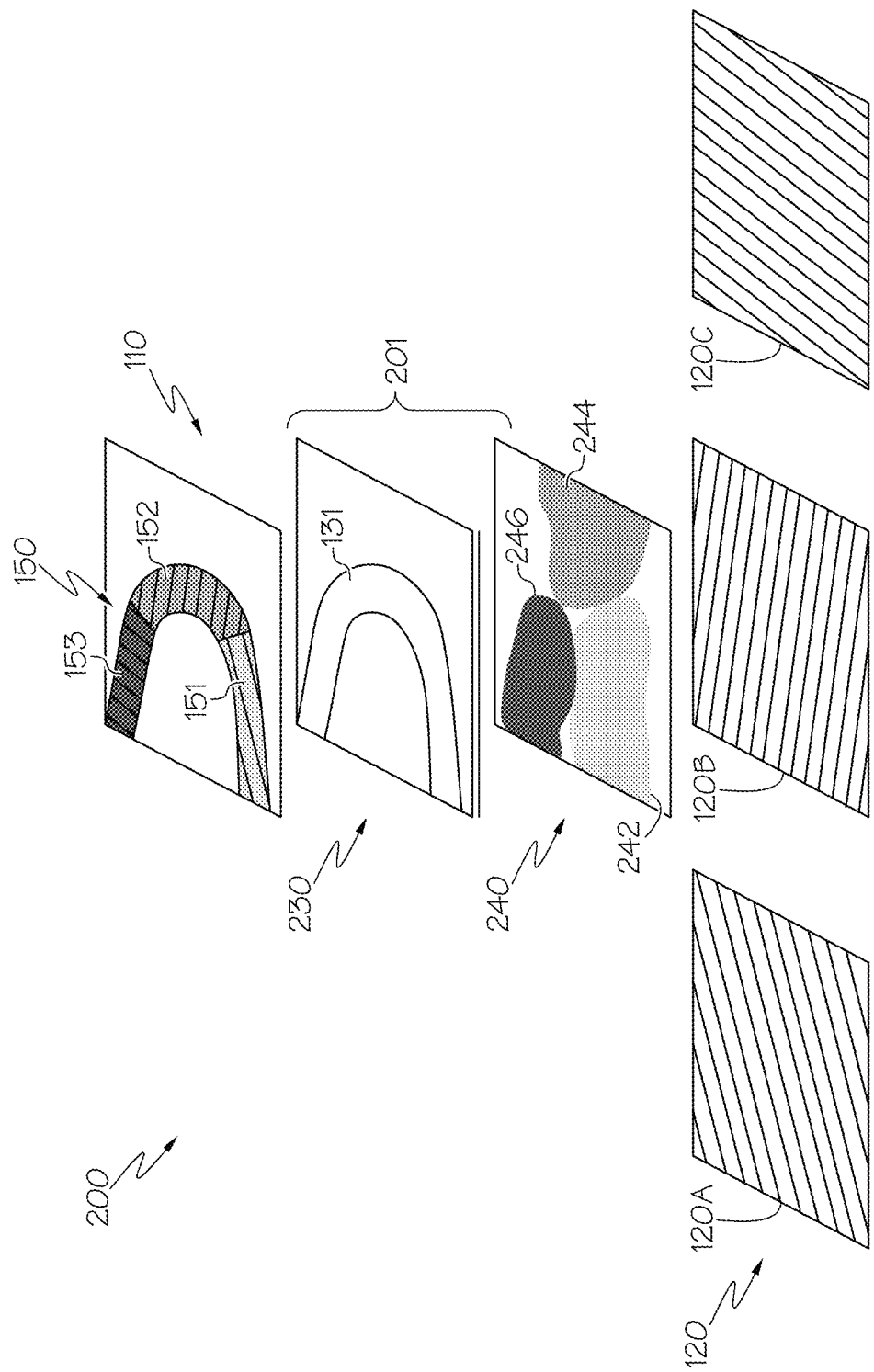
FIG. 3 schematically depicts an design field setup having a common membership field and a common density field for a multi-component optimization method according to one or more embodiments described and illustrated herein.

FIG. 3 schematically illustrates another example design field setup 200. The membership field layer is configured as a common membership field 240, and the density field layer is a configured as a common density field 230. The common density field 230 is a common field for all components, which represents the material density of each design point, i.e., the overall topology of a structure. In this embodiment, the common membership field 240 may take on multiple values to indicate which component, if any, a design point is assigned. For example, a zero may indicate no membership (i.e., zero membership), a one may indicate membership in the first component 151 (e.g., within region 242), a two may indicate membership in the second component 152 (e.g., within region 244), and a three may indicate membership in the third component 153 (e.g., within region 246). It should be understood that embodiments are not limited to values of 0-3. The common density field 230 is projected without influence of the membership variable. However, the first, second and third orientation fields 120A, 120B, 120C is filtered per the membership field value. For example, a value of the second orientation field 120B is projected to the simulation model where the membership value is two (region 244).

Figure 4:
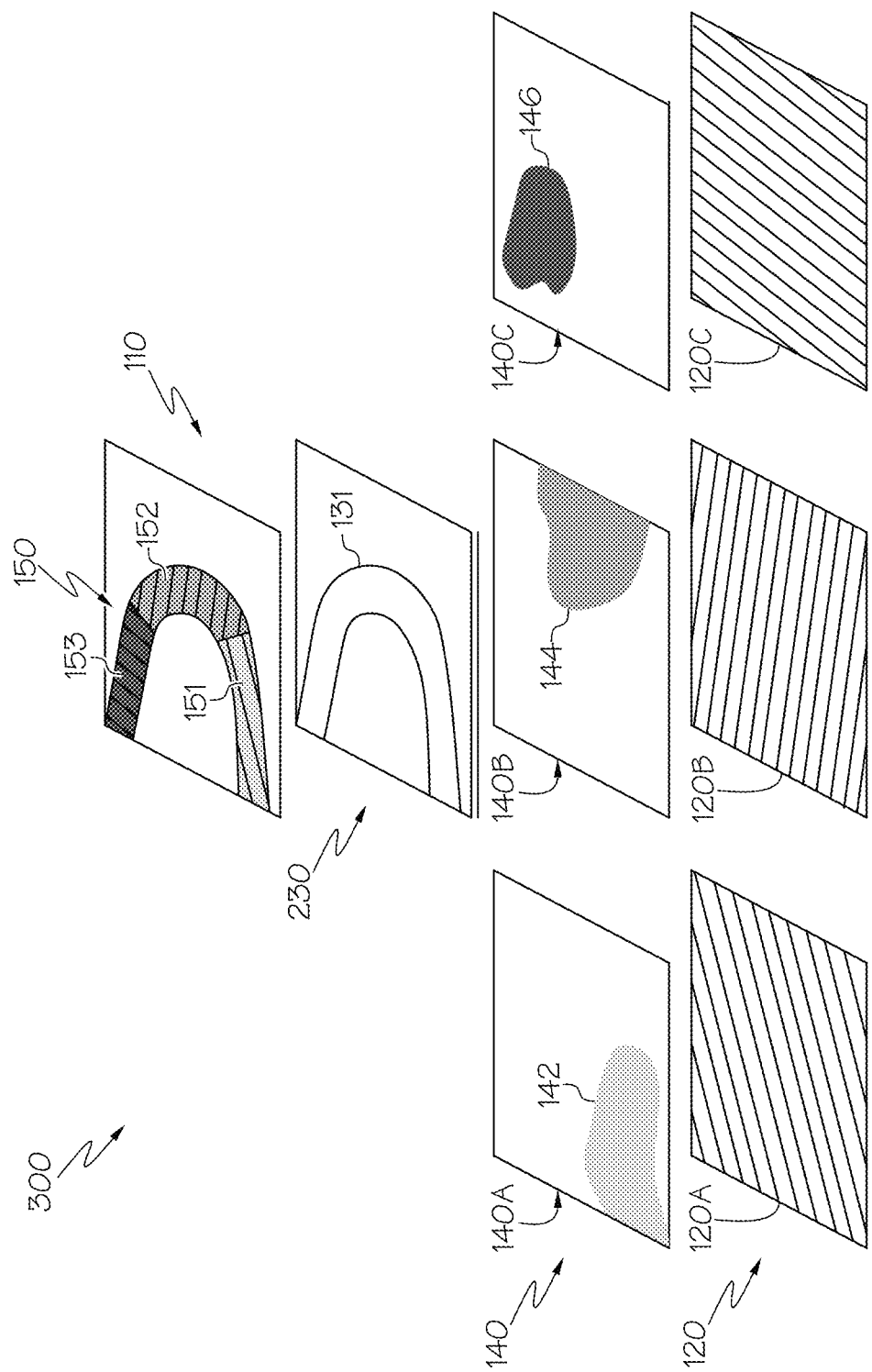
FIG. 4 schematically depicts an example design field setup having a common density field for a multi-component optimization method according to one or more embodiments described and illustrated herein.

FIG. 4 schematically illustrates another example design field setup 300. In this example, there is a common density field 230, first, second and third membership fields 140A-140C and first, second and third orientation fields 120A-120C.

Figure 5:
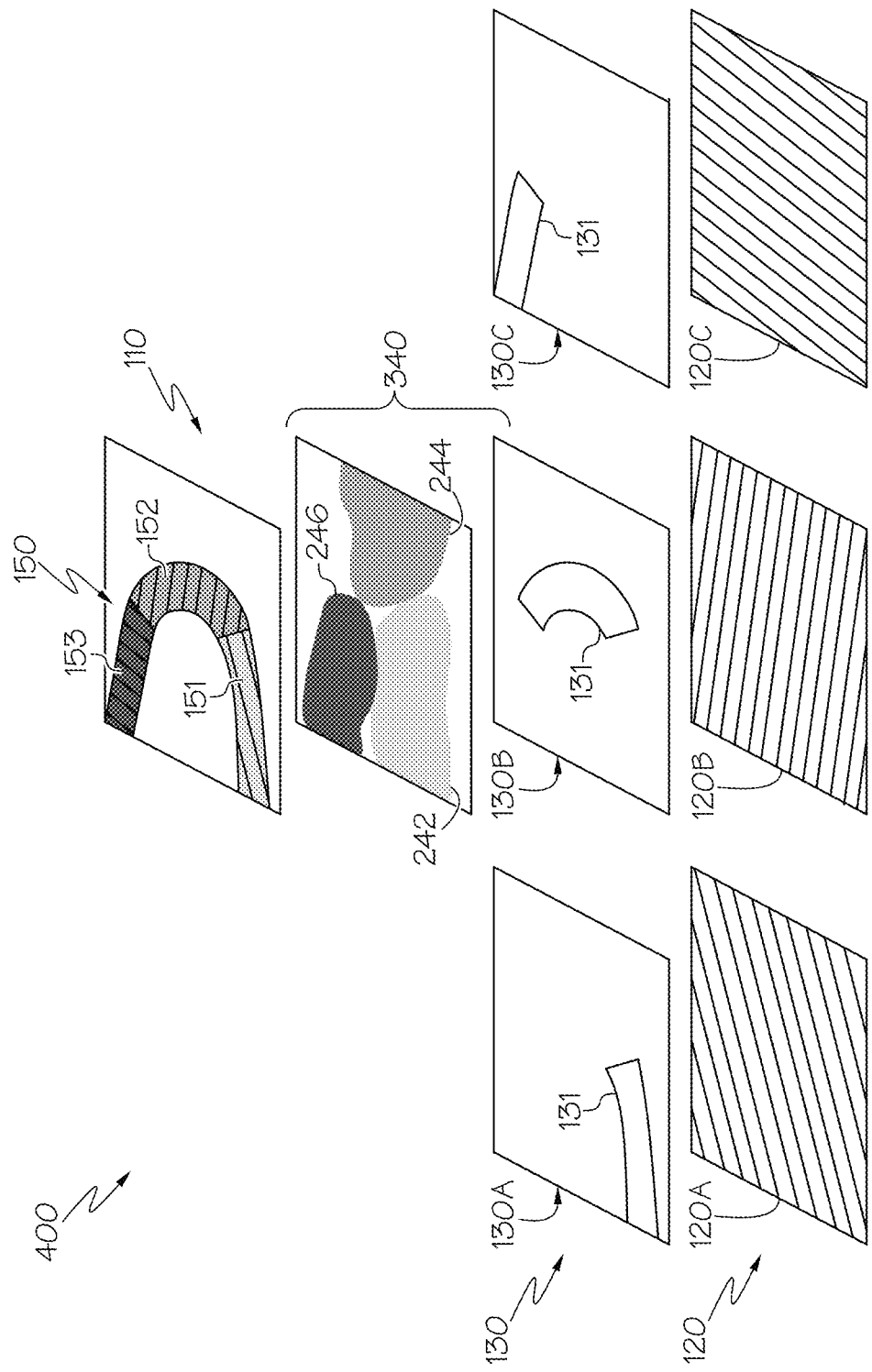
FIG. 5 schematically depicts an example design field setup having a common membership field for a multi-component optimization method according to one or more embodiments described and illustrated herein.

FIG. 5 schematically illustrates another example design field setup 400, wherein there is a common membership field 240 similar to as shown in FIG. 3. However, there are first, second and third density fields 130A-130C including density information 131, and first, second and third orientation fields 120A-120C including orientation information.

It is also possible to unify the membership fields and density fields by having a void membership (e.g., m=0), which represents a void domain, by sacrificing some degree of freedom in control. Referring now to FIG. 6, another example design field setup 500 is schematically illustrated. The design field setup 500 includes a common membership and density field 460. In such embodiments, freedom in control of independent design granularity control (length scale control) of partitioning and finest design feature is sacrificed by using a separate averaging filter.

Membership information and density information are both provided by the common membership and density field 460. For example, density values for a first component 151 of the structure 150 are projected from a first region 442, density values for a second component 152 of the structure 150 are projected from a second region 444, and density values for a third component 153 of the structure 150 are projected from a third region 446 of the common membership and density field 460. Further, membership within the first, second and third components 151-153 is also determined by the values of the common membership and density field 460.

In a non-limiting example, a value of zero in the common membership and density field 460 indicates a void membership for the design point (i.e., the design point is outside of the resulting structure 150). A design point having a value within a first range may indicate membership within a first region 442 and a first component 151, a value within a second range may indicate membership within a second region 444 and a second component 152, and a value within a third range may indicate membership within a third region 446 and a third component 153. For example, a value within the range 0<x<1 may indicate membership within a first region 442 and a first component as shown in FIG. 6. The decimal value may provide the density of the material (e.g., 0.56). A value within the range 1≤x<2 may indicate membership within the second region 444 and the second component 152. The decimal value may provide the density of the material (e.g., a value of 1.56 would project a density value of 0.56). A value within the range 2≤x<3 may indicate membership within the third region 446 and the third component 153 (e.g., a value of 2.56 would project a density value of 0.56).

In some embodiments, there may be fractional memberships during topology optimization. For example, a design point may be a fractional member of the first region 442 and the second region 444. During optimization, constraints may be provided to encourage the design point to converge to a non-fractional membership.

Detailed discussion for the density, membership, and material orientation design fields are presented below.

It is noted that the regularization of these design fields may follow the framework proposed in Kawamoto et al., 2011. *Heaviside projection based topology optimization by a PDE-filtered scalar function*. Structural and Multidisciplinary Optimization 44 (1), 19-24, using the Helmholtz PDE filtering and Heaviside projection.

Density Field Layer

A detailed description of the density field layer 130 is now described. In a prescribed, fixed design domain D, a characteristic function x is defined to describe the material domain $\Omega_d$ to be optimized:

$$\chi^{(x)} = \begin{cases} 0 \text{ for } \forall x \in D\backslash\Omega_d \\ 1 \text{ for } \forall x \in \Omega_d \end{cases}, \quad (1)$$

where x stands for a design point in D and $\chi^{(x)}$ is defined by a scaler function $\phi$ and the Heaviside function H such that:

$$\chi^{(x)} = H(\phi(x)) = \begin{cases} 0 \text{ for } \forall x \in D\backslash\Omega_d \\ 1 \text{ for } \forall x \in \Omega_d \end{cases}, \quad (2)$$

To eliminate checkerboard patterns therefore generating mesh-independent results, the Helmholtz PDE filter is introduced to regularize $\phi$:

$$-R_\phi^2 \nabla^2 \tilde{\phi} + \tilde{\phi} = \phi, \quad (3)$$

where $R_\phi$ is the filter radius, and $\tilde{\phi}$ is the filtered field. Then the density field $\rho$ may be defined by an additional regularized Heaviside function $\tilde{H}$:

$$\rho = \tilde{H}(\tilde{\phi}). \quad (4)$$

Orientation Field Layer

Following the Cartesian representation of continuous angles proposed in Nomura, et al., 2015. *General topology optimization method with continuous and discrete orientation design using isoparametric projection*, International Journal for Numerical Methods in Engineering 101 (8), 571-605 (hereinafter "Nomura, et al."), which is hereby incorporated by reference in its entirety, the original material orientation vector field $\vartheta^{(k)} = (\varsigma^{(k)}, \zeta^{(k)})$, bounded by a box constraint $\upsilon(k) \in [-1, 1]^D$ is first regularized by the Helmholtz PDE filter:

$$-R_\upsilon \nabla^2 \begin{bmatrix} \tilde{\xi}^{(k)} \\ \tilde{\eta}^{(k)} \end{bmatrix} + \begin{bmatrix} \tilde{\xi}^{(k)} \\ \tilde{\eta}^{(k)} \end{bmatrix} = \begin{bmatrix} \xi^{(k)} \\ \eta^{(k)} \end{bmatrix}, \quad (5)$$

where $R_\upsilon = R_\upsilon^2 I$, $R_\upsilon$ is the filter radius; I is an identity matrix; and $\overline{\upsilon}^{(k)} = (\tilde{\xi}^{(k)}, \tilde{\eta}^{(k)})$ is the filtered orientation field. Then, the (unbounded) $\overline{\upsilon}^{(k)}$ is projected back to the original box constraint with a regularized Heaviside function $\tilde{H}$:

$$\overline{v}^{(k)} = \begin{bmatrix} \overline{\xi}^{(k)} \\ \overline{\eta}^{(k)} \end{bmatrix} = \begin{bmatrix} 2\tilde{H}(\tilde{\xi}^{(k)} - 1) \\ 2\tilde{H}(\tilde{\eta}^{(k)} - 1) \end{bmatrix}. \quad (6)$$

Figures 7A, 7B:
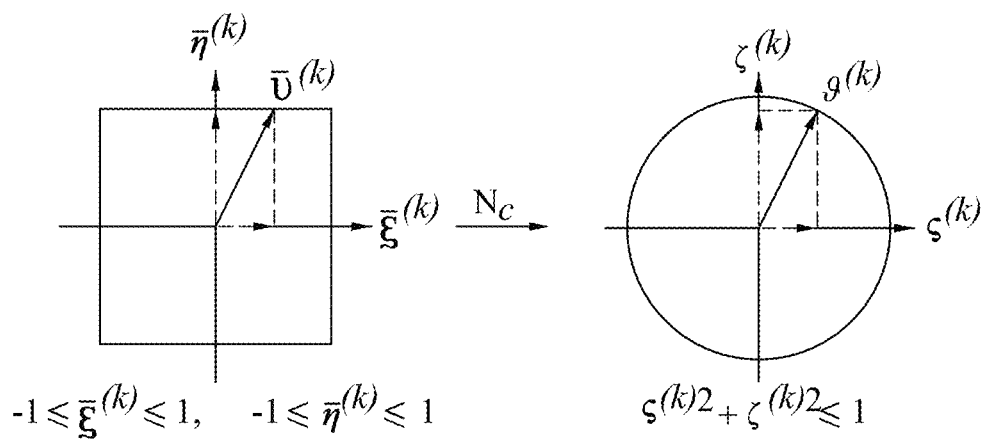
FIGS. 7A and 7B graphically depict an example coordinate transformation for a Cartesian orientation representation through an isoparametric projection scheme according to one or more embodiments described and illustrated herein.

As illustrated in FIGS. 7A and 7B, the regularized orientation vector field $\overline{v}^{(k)}$ in a box domain (FIG. 7A) is then projected to a circular domain (FIG. 7B) through an isoparametric projection $N_c$:

$$\vartheta^{(k)} = N_c(\overline{v}^{(k)}) = \begin{bmatrix} N_{cx}(\overline{\xi}^{(k)}, \overline{\eta}^{(k)}) \\ N_{cy}(\overline{\xi}^{(k)}, \overline{\eta}^{(k)}) \end{bmatrix}. \quad (7)$$

where $\vartheta^{(k)} = (\zeta^{(k)}, \xi^{(k)})$ is the projected orientation vector field. The transformation from a box domain to a circular domain eliminates the need of the quadratic constraint $\xi^{(k)2} + \eta^{(k)2} = 1$ for each design point, and ensures singularity-free numerical analyses. A detailed description of the isoparametric projection $N_c$ is provided by Nomura, et al.

By setting different values for $R_v$ in Equation (5), the maximum allowable curvature of the material orientation in each component k can be explicitly controlled. With a large enough $R_v$, the resulting material orientation can be unidirectional.

Membership Field Layer

Figures 8A, 8B:
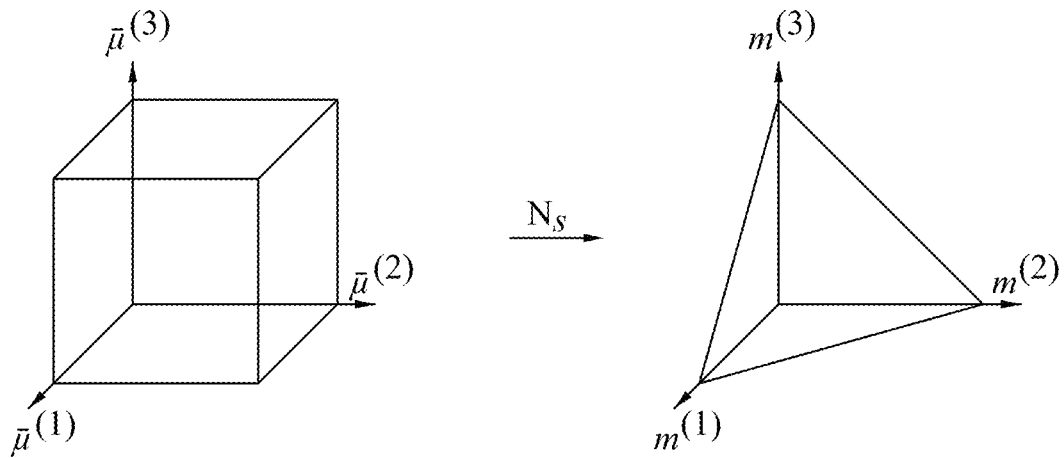
FIGS. 8A and 8B graphically illustrate an example coordinate transformation for the component membership design field through a K-dimensional cube-to-simplex projection for an example case of K=3 according to one or more embodiments described and illustrated herein.

Following the similar regularization scheme as material density and orientation design fields, the original membership field $\mu^{(k)}$ is transformed to $\tilde{\mu}^{(k)}$ and then $\overline{\mu}^{(k)}$ through the Helmholtz PDE filter and regularized Heaviside projection. For each design point, the resulting $\overline{\mu} = (\overline{\mu}^{(1)}, \overline{\mu}^{(2)} \ldots \overline{\mu}^{(K)})$ is bounded by a K-dimensional unit cube $[0, 1]^K$. As illustrated by FIGS. 8A and 8B, the regularized component membership vector field $\overline{\mu}$ in a cube domain (FIG. 8A) is then projected to a standard simplex domain (FIG. 8B) through a projection $N_S$:

$$m = N_s(\overline{\mu}), \quad (8)$$

where $m = (m^{(1)}, m^{(2)}, \ldots, m^{(K)})$ is the projected component membership vector field. The transformation from a cube domain to a standard simplex domain eliminates the need of unity constraint $m^{(1)} + m^{(2)} + \ldots + m^{(K)} = 1$ for each design point and ensures singularity-free numerical analyses.

The cube-to-simplex projection $N_S = (N_S^{(1)}, N_S^{(2)}, \ldots N_S^{(K)})$ is defined as:

$$m^{(k)} = N_S^{(k)}(\overline{\mu}) = \Sigma_{i=1}^M S_i^{(k)} \{(-1)^{(K+\Sigma_{k=1}^K c_i^{(k)})} \\ \Pi_{k=1}^K (\overline{\mu}^{(k)} + c_i^{(k)} - 1)\}, \quad (9)$$

where $M = 2^k$ and $c_i^{(k)} \in \{0, 1\}$ are the number of vertices and the k-th element of the i-th vertex of a K-dimensional unit cube, respectively; and $s_i^{(k)}$ is vertex $c_i^{(k)}$ projected to a K-dimensional standard simplex domain given as:

$$S_i^{(k)} = \begin{cases} \dfrac{c_i^{(k)}}{\sum_{k=1}^K c_i^{(k)}} & \text{if } \sum_{k=1}^K c_i^{(k)} \geq 1 \\ 0 & \text{otherwise} \end{cases} \quad (10)$$

By adopting a multi-phase SIMP-like formulation, the elasticity tensor at each design point can be composed by over-laying the elasticity tensor for each component:

$$C = \rho^{P_d} \Sigma_{k=1}^K (m^{(k)})^{P_m} C^{(k)}, \quad (11)$$

where C and $C^{(k)}$ are the composed elasticity tensor and the elasticity tensor for component k, respectively; and $P_d$ and $P_m$ are the penalization parameters for density and component membership, respectively.

This way of composing the elasticity tensor for each phase (component in this case) may be a simplest choice for multi-phase topology optimization. However, it does not satisfy the unity constraint $m^{(1)} + m^{(2)} + \ldots + m^{(K)} = 1$, which allows only one of phase fields (component membership fields in this case) $m^{(k)}$ converging to 1. Rather, Equation (11) often favors all phase fields (component membership fields in this case) $m^{(k)}$ converging to 1, since it would maximize the composed tensor C with respect to $m^{(k)} \in [0, 1]$. To resolve this issue, the proposed cube-to-simplex projection discussed above may be an approach to satisfy the membership unity condition. Through the proposed cube-to-simplex projection, the vertices in a unit cube that violate the unity condition (i.e., the ones outside of a standard simplex attached to the cube) are projected inside of a cube and the convergence to them is discouraged by the power law penalization.

By incorporating the material orientation field $\vartheta^{(k)}$ into component elasticity tensor $C^{(k)}$, the modified composed elasticity tensor C can be rewritten as:

$$C = \rho^{P_d} \Sigma_{k=1}^K (m^{(k)})^{P_m} C^{(k)}(\vartheta^{(k)}), \quad (12)$$

with the transformed anisotropic tensor $C^{(k)}(\vartheta^{(k)})$, given as:

$$C^{(k)}(\vartheta^{(k)}) = C_i + \hat{T}^{-1}(\vartheta^{(k)}) \cdot (C_u - C_i) \cdot \hat{T}(\vartheta^{(k)}), \quad (13)$$

where $C_u$ is a unrotated anisotropic tensor; $C_i$ is an isotropic component; and $\hat{T}$ and $\hat{T}$ are transformations to rotate a tensor to a direction based on $(\vartheta)^{(k)}$. A detailed explanation and derivation of the transformed anisotropic tensor is provided in Nomura, et al.

Figure 9:
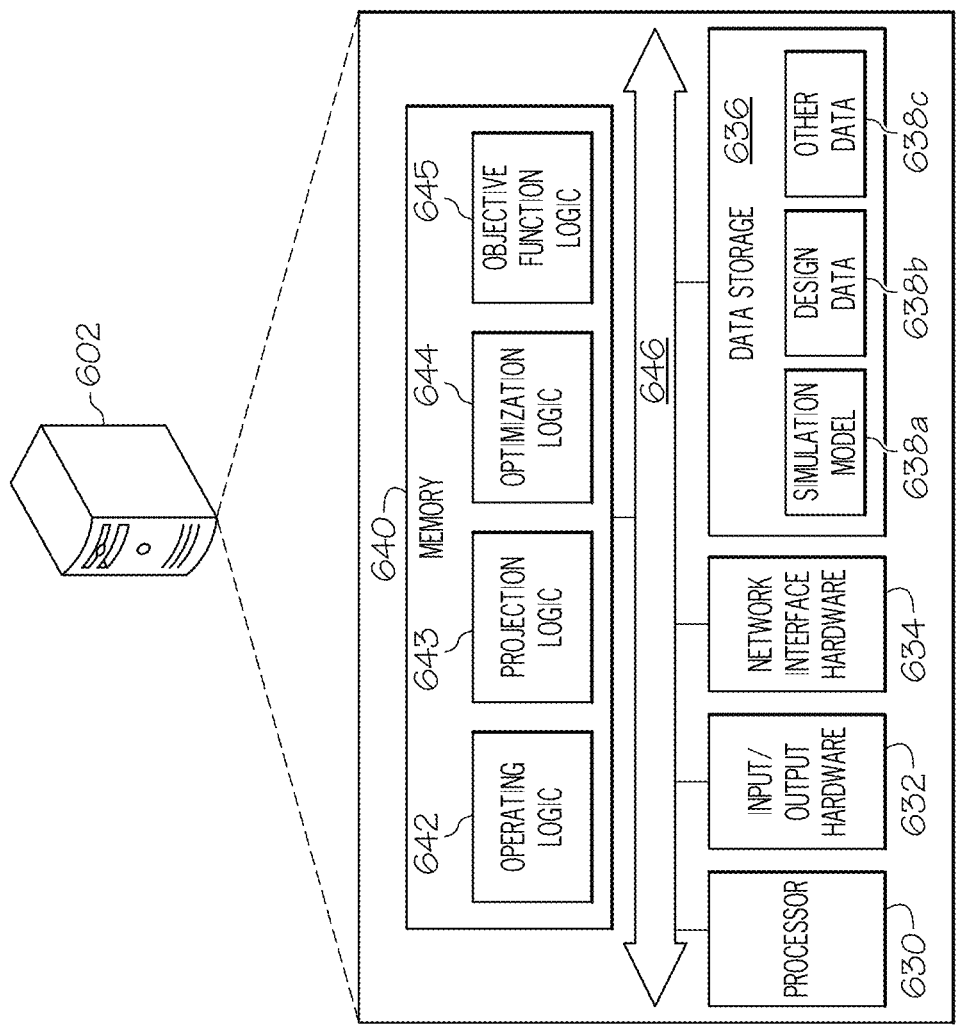
FIG. 9 schematically illustrates an example computer system for performing the computer-implemented methods for topology optimization of multi-component structures according to one or more embodiments described and illustrated herein.

FIG. 9 depicts an example computing device 602, further illustrating a system for multi-component topology optimization, and/or a non-transitory computer usable medium having computer readable program code for multi-component topology optimization embodied as hardware, software, and/or firmware, according to embodiments shown and described herein. While in some embodiments, the computing device 602 may be configured as a general purpose computer with the requisite hardware, software, and/or firmware, in some embodiments, the computing device 602 may be configured as a special purpose computer designed specifically for performing the functionality described herein. It should be understood that the software, hardware, and/or firmware components depicted in FIG. 9 may also be provided in multiple computing devices rather than one as shown in FIG. 9.

As also illustrated in FIG. 9, the computing device 602 may include a processor 630, input/output hardware 632, network interface hardware 634, a data storage component 636 (which may store simulation model data 638a, design data 638b, and other data 638c), and a non-transitory memory component 640. The memory component 640 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 640 may be configured to store operating logic 642, projection logic 643, optimization logic 644, and objective function logic 645 (each of which may be embodied as computer readable program code, firmware, or hardware, as an example). A local interface 646 is also included in FIG.

9 and may be implemented as a bus or other interface to facilitate communication among the components of the computing device 602.

The processor 630 may include any processing component configured to receive and execute computer readable code instructions (such as from the data storage component 636 and/or memory component 640). The input/output hardware 632 may include a graphics display device, keyboard, mouse, printer, camera, microphone, speaker, touch-screen, and/or other device for receiving, sending, and/or presenting data. The network interface hardware 634 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 636 may reside local to and/or remote from the computing device 602, and may be configured to store one or more pieces of data for access by the computing device 602 and/or other components. As illustrated in FIG. 9, the data storage component 636 may store simulation model data 638a, which in at least one embodiment includes information relating to the simulation model resulting from the multi-component topology optimization. Similarly, design data 638b may be stored by the data storage component 636 and may include information relating to the design field setup (e.g., the density field layer, the membership field layer and/or the orientation field layer). Other data 638c may be stored in the data storage component 636 to provide support for functionalities described herein as needed.

Included in the memory component 640 may be the operating logic 642, the projection logic 643, optimization logic 644, and the objective function logic 645. It should be understood that the memory component 640 and/or the data storage component 636 may store any logic capable of performing the functionalities described herein. The operating logic 642 may include an operating system and/or other software for managing components of the computing device 602. The operating logic may also include computer readable program code for displaying the graphical user interface. Similarly, the projection logic 643 may reside in the memory component 640 and may be configured to perform the projection techniques described herein (e.g., the cube-to-simplex projection, projection by an isoparametric shape function, and the like). The optimization logic 644 may perform the topographic optimization described herein, such as by a finite element program. The objective function logic 645 may be configured to calculate a design variable resulting from the simulation model of the multi-component optimization, such as compliance, as described herein.

It should be understood that the components illustrated in FIG. 9 are merely exemplary and are not intended to limit the scope of this disclosure. More specifically, while the components in FIG. 9 are illustrated as residing within the computing device 602, this is a non-limiting example. In some embodiments, one or more of the components may reside external to the computing device 602.

Optimization Problem

The overall optimization problem of multi-component topology and material orientation design can be stated as follows:

$$\text{minimize } F(u) \quad (14)$$
$$\phi$$
$$\mu^{(1)}, \ldots, \mu^{(K)}$$
$$\nu^{(1)}, \ldots, \nu^{(K)}$$
$$\text{subject to } g_1 := A_d - V^* \leq 0$$
$$\phi \in [-1, 1]^D$$
$$\text{for } k = 1, 2, \ldots, K:$$
$$g_2^{(k)} := -B^{(k)} + (1 - \epsilon) \leq 0$$
$$\mu^{(k)} \in [-1, 1]^D$$
$$\nu^{(k)} \in [-1, 1]^D \times [-1, 1]^D$$

where u is the displacement field obtained by solving the static equilibrium equations; F(u) is the objective function for a structural performance; K is the prescribed, maximum allowable number of components; g1 is the material volume constraint with upper bound $V^*$; $g_2^{(k)}$ is the constraint to ensure the material anisotropicity for the k-th component with small constant ε; and $A_d$ and $B^{(k)}$ are given as:

$$A_d = \int_D \rho d\Omega \quad (15)$$
$$B^{(k)} = \frac{1}{A_d} \int_D \|\partial^{(k)}\| d\Omega,$$

In the case of the minimization of structural compliance as discussed in the following examples, the objective function can be stated as:

$$F(u) = \frac{1}{2} \int_D \sigma^T \epsilon d\Omega, \quad (16)$$

and the static equilibrium equations can be stated as:

$$-\nabla \cdot \sigma = 0 \text{ in } D$$
$$u = 0 \text{ on } \Gamma_d,$$
$$\sigma \cdot n = t \text{ on } \Gamma_n \quad (17)$$

Numerical Examples

This section presents several numerical examples in two dimensions on compliance minimization based on a simplified orthotropic material model per Hull, D., Clyne, T., 1996. An introduction to composite materials. Cambridge university press:

$$E_1 = f_f E_f + (1 - f_f) E_m \quad (18)$$
$$E_2 = \{f_f / E_f + (1 - f_f) / E_m\}^{-1}$$
$$G_{12} = \{f_f / G_f + (1 - f_f) / G_m\}^{-1}$$
$$\nu_{12} = f_f \nu_f + (1 - f_f) \nu_m$$
$$\nu_{21} = \{f_f \nu_f + (1 - f_f) \nu_m\} \frac{E_2}{E_1}$$

Table 1 below summarizes the values of the material properties in Equation (18) used in the numerical examples.

TABLE 1

Material properties for the numerical examples.

| Symbol | Value | Description |
| --- | --- | --- |
| $E_f$ | 1 | Young's modulus of reinforcement material |
| $E_m$ | 1/15 | Young's modulus of matrix material |
| $v_f$ | 0.22 | Poisson ratio of reinforcement material |
| $v_m$ | 0.38 | Poisson ratio of matrix material |
| $f_f$ | 0.5 | Fiber fraction for anisotropic material | where $\sigma = C \cdot \epsilon$ is the stress field; $\epsilon$ is the strain field; $\Gamma_d$ is the Dirichlet boundary defined by zero prescribed displacement; and $\Gamma_n$ is the Neumann boundary defined by the normal n and the prescribed traction t.

In all examples, the results obtained by the proposed multi-component topology and orientation optimization are compared to the ones by: 1) the single-piece topology optimization with an isotropic material using the conventional SIMP method, and 2) the single-piece topology and continuous orientation optimization using Nomura et al. For the single-piece topology optimization with an isotropic material, the equivalent material property of randomly orientated discontinuous short fibers are used per:

$$\tilde{E} = \tfrac{3}{8}E_1 + \tfrac{5}{8}E_2$$

$$\tilde{G} = \tfrac{1}{8}E_1 + \tfrac{1}{4}E_2, \quad (19)$$

The nonlinear constrained optimization problem in Equation (14) is solved by the method of moving asymptotes with the first derivatives of the objective and constraints. The sensitivity analysis follows the standard adjoint method and is implemented using COMSOL Multiphysics.

The continuation method is applied to the two penalty parameters $P_d$ and $P_m$, and the anisotropicity constraint parameter in Equation (14), based on a fixed continuation and convergence strategy. The density penalty $P_d$ was initialized as 1.5, and updated to 2, 2.5, and 3 at iteration 60, 90, and 120 respectively. The membership penalty $P_m$ was initialized as 1, and updated to 1.5, 2, 2.5, and 3 at iteration 60, 90, 120, and 150 respectively. The anisotropicity constraint parameter was initialized as 1, and updated to 0.2, 0.1, and 0.02 at iteration 60, 90, and 120 respectively. The maximum number of iterations was set to 200. An alternative strategy for continuation and convergence can also be implemented based on relative measures, e.g., the maximum change in design variables and the first order optimality.

The initial density and component membership were uniformly set to $\rho = V^*$ and $m^{(k)} = 1/K$, respectively. The initial angle $\theta^{(k)}$ for each component k was set to:

$$\theta^{(k)} = \begin{cases} 0° & \text{if } K = 1 \\ (k-1)\left(\frac{180}{K}\right)° & \text{otherwise} \end{cases} \quad (20)$$

where the norm of orientation Cartesian components $\|\vartheta^{(k)}\|$ was initialized below 0.3, indicating weak initial anisotropicity.

Single Load Cantilever Example

Figure 10:
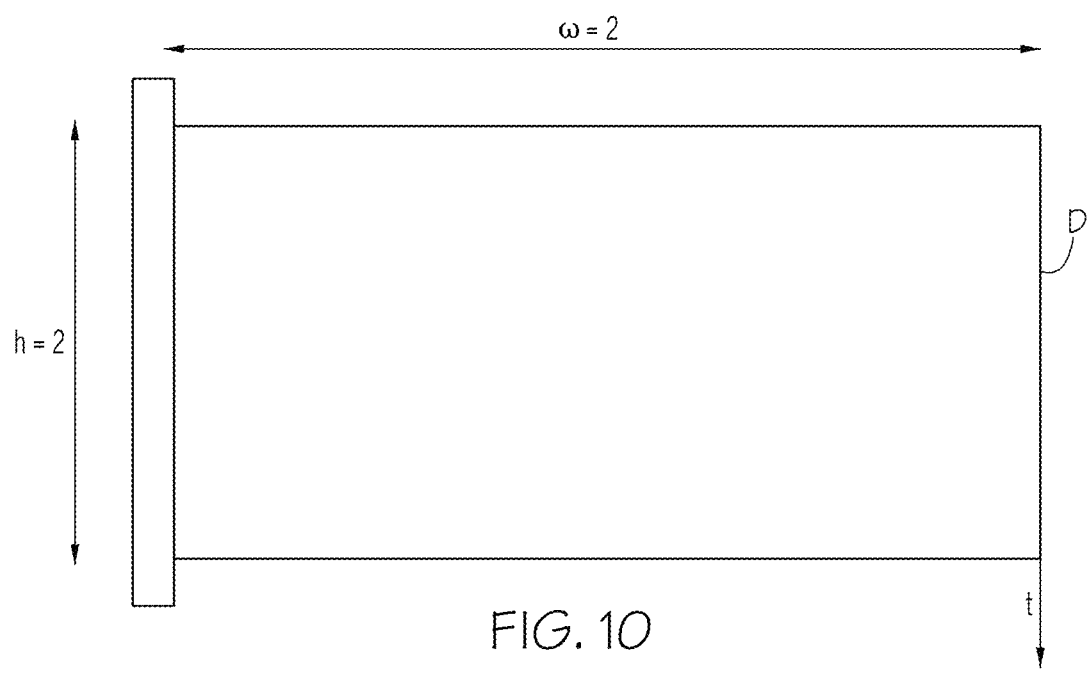
FIG. 10 schematically illustrates an example design domain and boundary conditions for a single load cantilever problem.

The proposed multi-component topology optimization method is first applied to a single load cantilever problem. Its design domain D and boundary conditions are shown in FIG. 10. The left side of the cantilever is fixed in all degrees of freedom. A unit load is applied at the lower right corner.

A square grid mesh with a side length of 0.02 is used to discretize the design domain D using the Lagrange linear quadrilateral elements. The upper bound for the material volume fraction $V^*$ is set as 0.5. The maximum allowable number of components is set as K=3.

FIGS. 11A-11D show intermediate multi-component topologies at different iterations during the course of optimization.

Figures 11A, 11B:
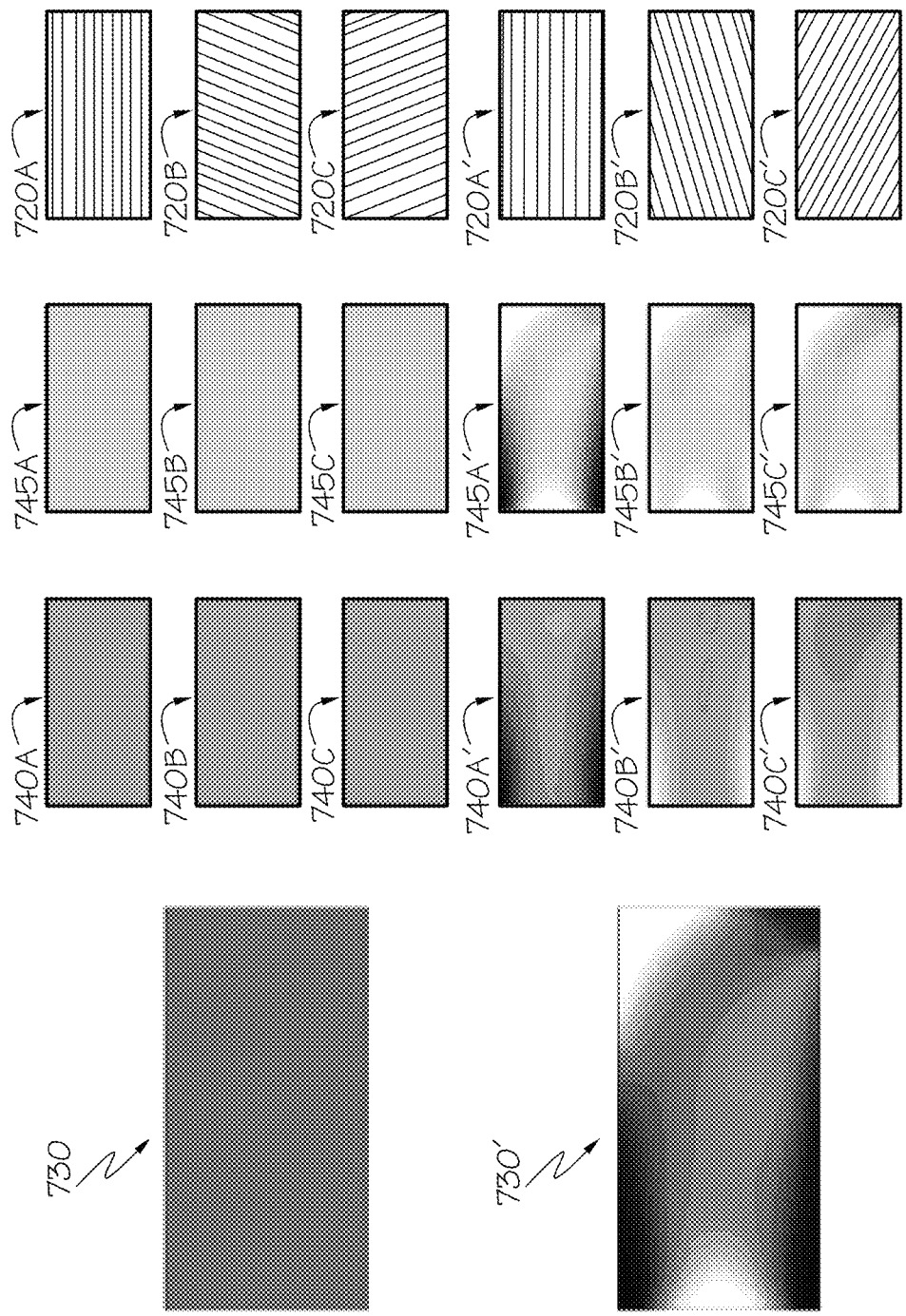
FIG. 11A illustrates all design fields for the single load cantilever problem of FIG. 10 with K=3 at a first iteration.
FIG. 11B illustrates all design fields for the single load cantilever problem of FIG. 10 with K=3 at a fifth iteration.
Figures 11C, 11D:
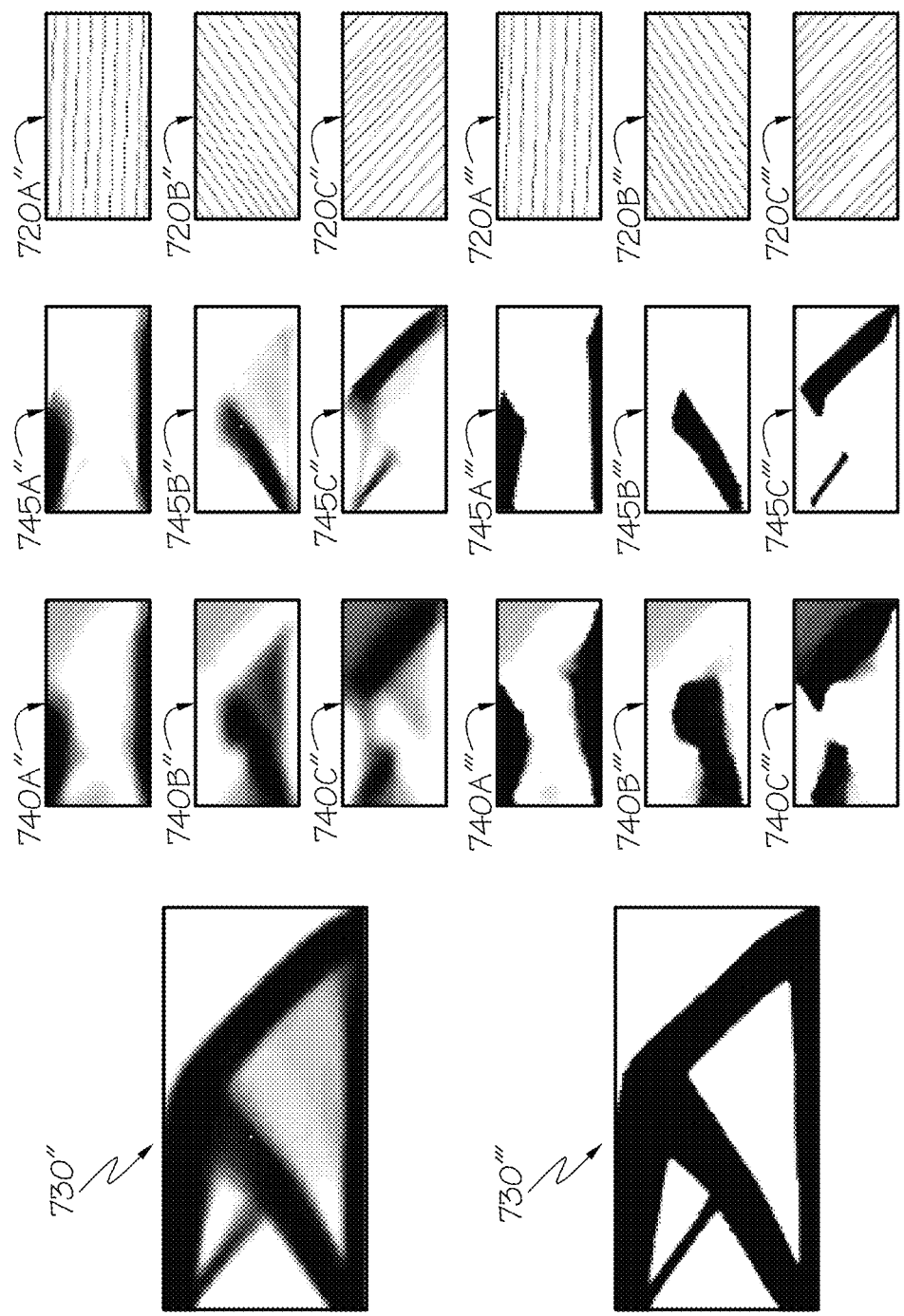
FIG. 11C illustrates all design fields for the single load cantilever problem of FIG. 10 with K=3 at a fiftieth iteration.
FIG. 11D illustrates all design fields for the single load cantilever problem of FIG. 10 with K=3 at a two-hundredth iteration.

FIG. 11A illustrates all design fields for the single load cantilever problem of FIG. 10 with K=3 at a first iteration. FIG. 11B illustrates all design fields for the single load cantilever problem of FIG. 10 with K=3 at a fifth iteration. FIG. 11C illustrates all design fields for the single load cantilever problem of FIG. 10 with K=3 at a fiftieth iteration. FIG. 11D illustrates all design fields for the single load cantilever problem of FIG. 10 with K=3 at a two-hundredth iteration;

For each iteration, from left to right, the density field $\rho$ 730, 730', 730'', 730''' membership field $m^{(k)}$ (740A-740C, 740A'-740C', 740A''-740D'', and 740A'''-740D'''), component field (product of the two) $\rho m^{(k)}$ (745A-745C, 745A'-745C', 745A''-745C'', and 745A'''-745C'''), and material orientation field $\vartheta^{(k)}$ (720A-720C, 720A'-720C', 720A''-720C'', 720A'''-720C''') are shown. The filter radius $R_\theta$ in Equation (5) is set to a large enough value so the $\vartheta^{(k)}$ can become unidirectional within each component k.

As discussed above, the optimization was initialized with uniform density and membership distributions. The material anisotropicity levels were initialized as very weak, as seen in FIG. 11A. The component partitioning started happening when the overall topology was not yet clear (FIG. 11B), and finally converged at iteration 200 (FIG. 11D). Both the angular values and anisotropicity levels of the optimized orientations are different from their initializations.

With the cube-to-simplex projection and penalization scheme, undesired vertices in the original cube domain that do not satisfy the membership unity constraint have been eliminated. With the continuation on the penalization parameter $P_m$, the component membership field gradually converged to the three vertices with unique membership selections. The component partitioning at the end of optimization at iteration 200 in FIG. 11D shows that a unique selection of memberships for each non-void design point is successfully achieved with the proposed cube-to-simplex projection and penalization scheme.

The resulting multi-component topology and its component-wise unidirectional orientations are plotted in FIG. 1. It is seen that the resulting material orientations mostly align the longitudinal directions of beam-like substructures. This supports an empirical knowledge that the optimal material orientation should coincide with the major principal stress direction for compliance minimization problems. The resulting optimized structural compliance is 6.21. While desirable for economical production in large quantities, multi-component structures with component-wise unidirectional orientations like this cannot be obtained by existing continuous orientation methods or discrete orientation methods.

Figure 12A:
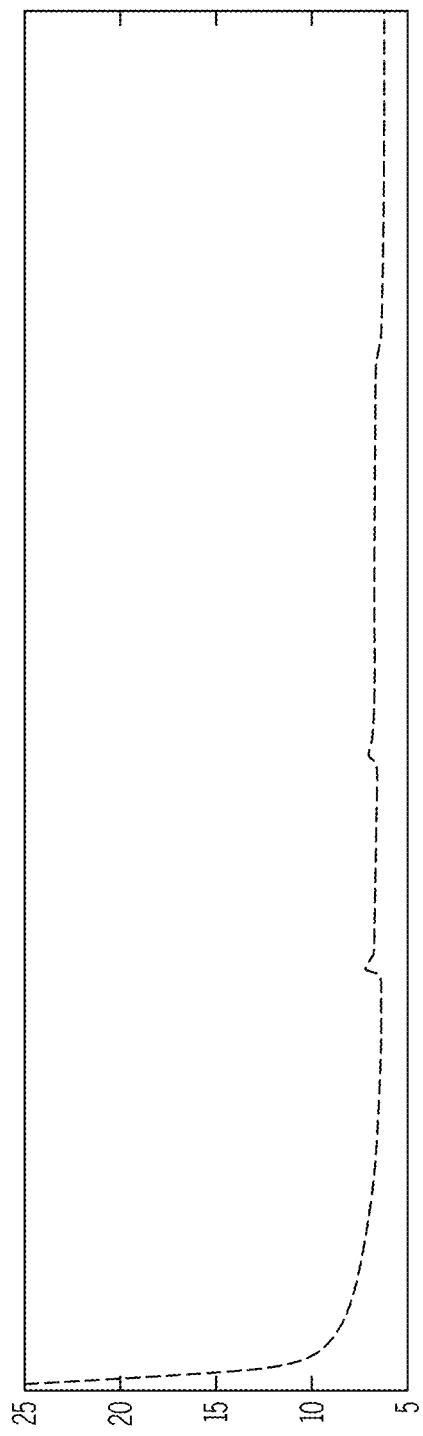
FIG. 12A graphically illustrates convergence history for compliance for the single load cantilever problem with K=3.
Figure 12B:
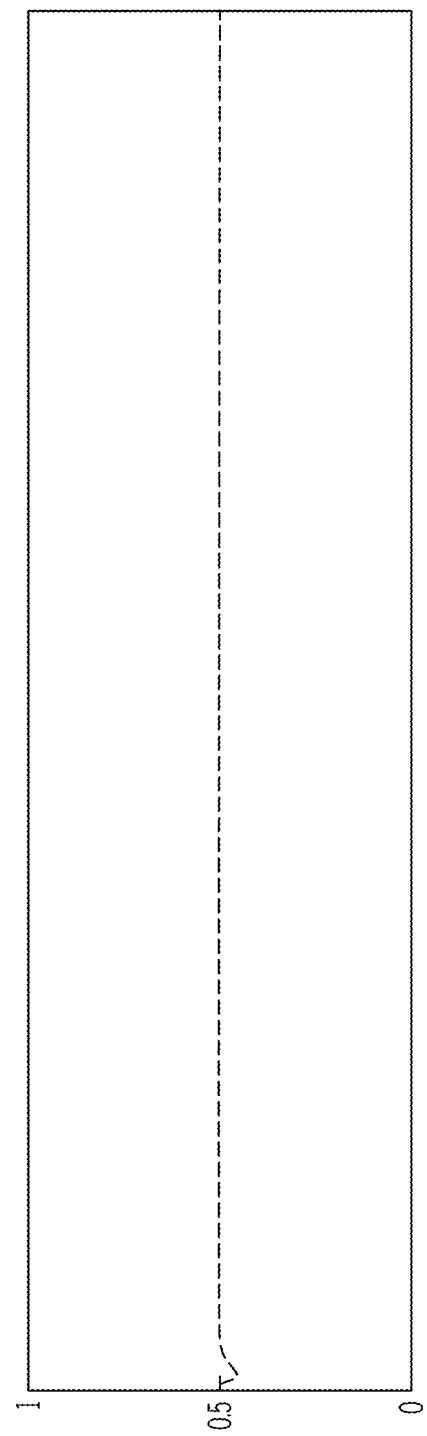
FIG. 12B graphically illustrates convergence history for a volume constraint for the single load cantilever problem with K=3.
Figure 12C:
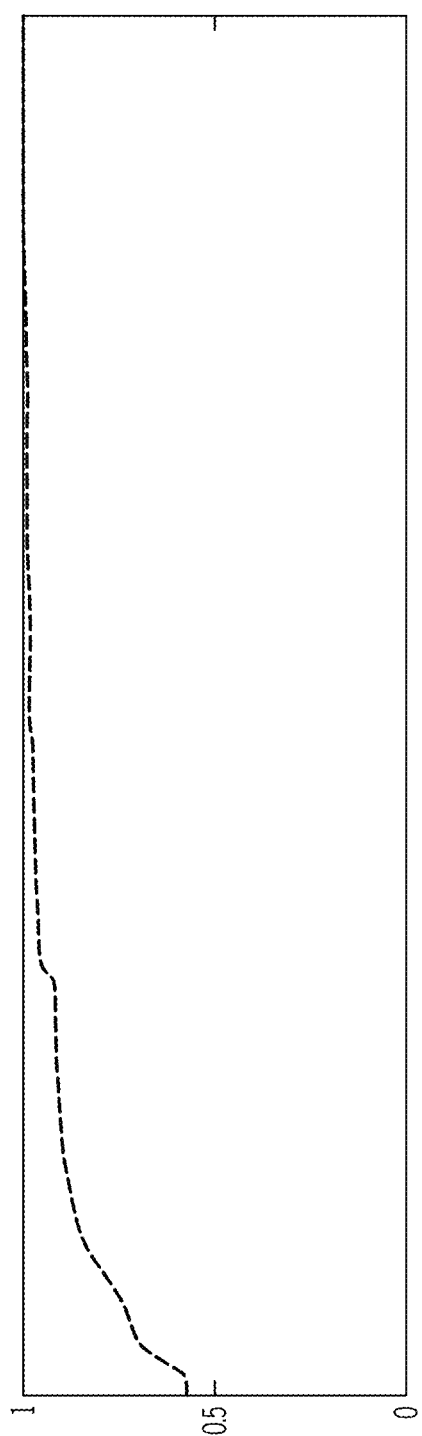
FIG. 12C graphically illustrates convergence history for a membership unit measure for the single load cantilever problem with K=3.
Figure 12D:
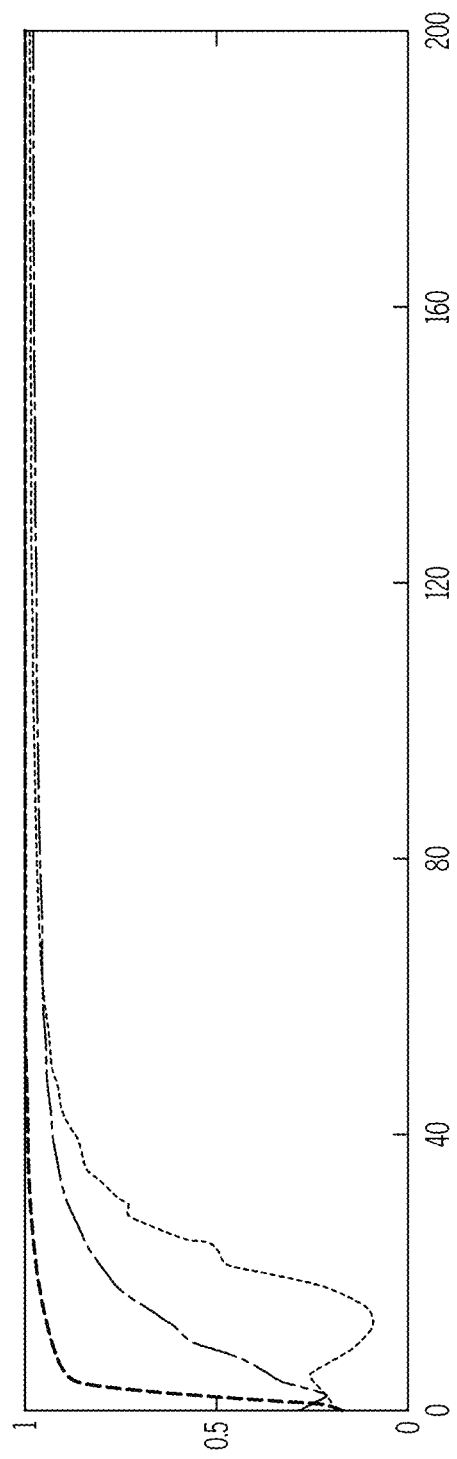
FIG. 12D graphically illustrates convergence history for material anisotropicity constraints for the single load cantilever problem with K=3.

The convergence history of the optimization process is plotted in FIGS. 12A-12D. FIG. 12A graphically illustrates convergence history for compliance for the single load cantilever problem with K=3. FIG. 12B graphically illustrates convergence history for a volume constraint for the single load cantilever problem with K=3. FIG. 12C graphically illustrates convergence history for a membership unit measure for the single load cantilever problem with K=3. FIG. 12D graphically illustrates convergence history for material anisotropicity constraints for the single load cantilever problem with K=3.

As seen in FIG. 12A, the local fluctuation of the compliance (objective function) was mainly caused by the continuation of the penalization parameters. Otherwise, it was almost monotonically decreasing. As seen in FIG. 12B, the volume constraint remained active throughout the optimization. As seen in FIG. 12C, the membership field also satisfied the unity constraints, because the unity measure $\int_D \rho \|m\| d\Omega / A_d$ converged approximately to 1 at the end of optimization. Thanks to the adopted penalization scheme, the membership unity measure was not necessary as an additional constraint in the optimization problem. It was plotted here just for the monitoring purpose. As seen in FIG. 12D, the material anisotropicity constraints for all components were active at the end of optimization as well.

Figure 13A:
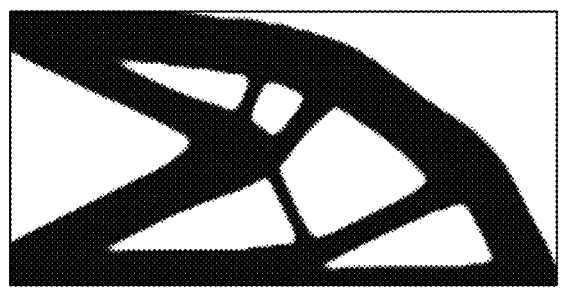
FIG. 13A illustrates an optimized single-piece topology with an isotropic material.
Figure 13B:
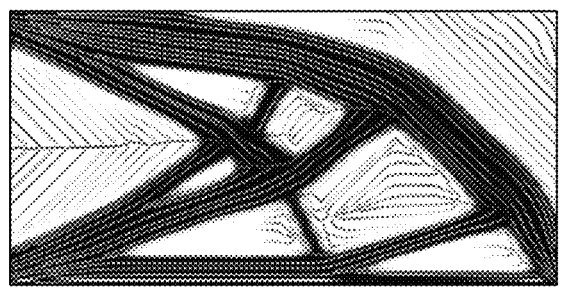
FIG. 13B illustrates an optimized single-piece topology with continuous material orientation.

As a comparison, the optimized single-piece topology with an isotropic material is presented in FIG. 13A following the assumption of randomly oriented discontinuous short fibers in Equation (19). Its optimized structural compliance is 9.92, which is inferior to the anisotropic multi-component design. In addition, the optimized single-piece topology with the continuous orientation design is presented in FIG. 13B following the method proposed in Nomura et al. The resulting compliance is 4.07, which is superior to both cases discussed above.

Curvilinear Fiber Orientation Example

Figure 14A:
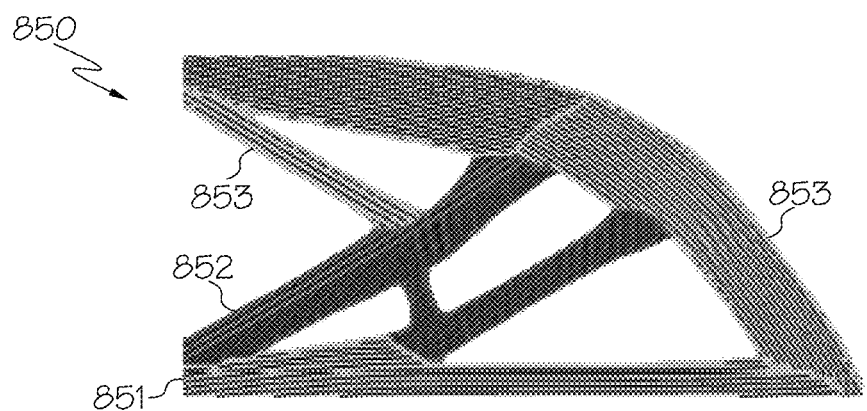
FIG. 14A illustrates an optimized multi-component topology for an optimized three-component design allowing component-wise curvilinear orientations.
Figure 14B:
FIG. 14B illustrates an optimized density field for the topology illustrated by FIG. 14A.
Figure 14C:
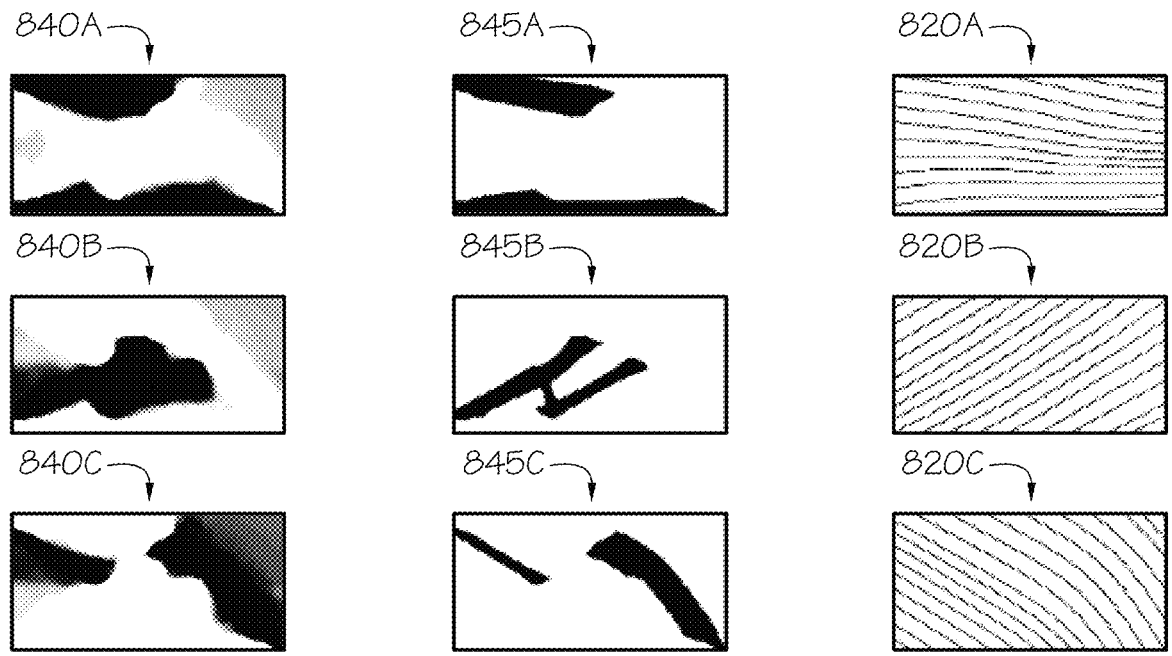
FIG. 14C illustrates the optimized membership field, the optimized component field, and the optimized material orientation field for three components of the topology illustrated by FIG. 14A.
Figure 15A:
FIG. 15A illustrates an optimized multi-component topology where K=1.
Figure 15B:
FIG. 15B illustrates an optimized multi-component topology of FIG. 15A where K=2.
Figure 15C:
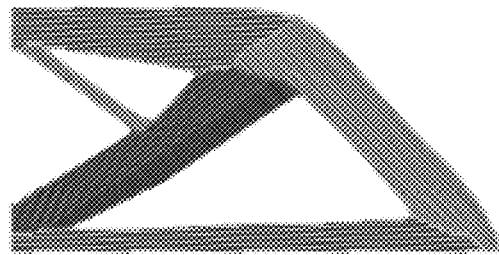
FIG. 15C illustrates an optimized multi-component topology of FIG. 15A where K=3.
Figure 15D:
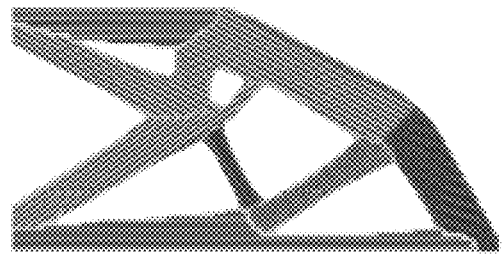
FIG. 15D illustrates an optimized multi-component topology of FIG. 15A where K=4.

One way to further improve the performance of multi-component composite structures is to allow curvilinear fiber orientations within each component instead of enforcing unidirectional fiber orientations. By reducing the filter radius on the orientation vector field, one can control the maximum allowable curvature of the fiber orientation within each component. FIG. 14A presents the optimized three-component topology design structure 850 (first component 851, second component 852, third component 853) allowing a moderate level of curvature on fiber orientations. The structural compliance is improved to 5.65, as opposed to 6.21 in the three-component unidirectional case. Its design fields at the end of optimization are visualized in FIGS. 14B and 14C. FIG. 14B illustrates the optimized density field $\rho$ 830. In FIG. 14C, a first component membership field $m^{(k)}$ 840A, a first optimized component field (product of the optimized density field $\rho$ and the first component membership field $m^{(k)}$) $\rho m^{(k)}$ 845A, and a first optimized material orientation field $\vartheta^{(k)}$ 820A of a first component 851 is illustrated. A second component membership field $m^{(k)}$ 840B, a second optimized component field (product of the optimized density field $\rho$ and the second component membership field $m^{(k)}$) $\rho m^{(k)}$ 845B, and a second optimized material orientation field $\vartheta^{(k)}$ 820B of a second component 852 is also illustrated. A third component membership field $m^{(k)}$ 840C, a third optimized component field (product of the optimized density field p and the third component membership field $m^{(k)}$) $\rho m^{(k)}$ 845C, and a third optimized material orientation field $\vartheta^{(k)}$ 820C of a third component 853 is also illustrated.

It is noted that the overall base topology is different from that of the unidirectional case. This is due to the interaction between the density and membership fields with the additional freedom on orientation tailoring. It should also be noted that by allowing curvilinear orientations in composite structures, it is likely that more advanced composite processing techniques may be required, which may come with a higher production cost than composite manufacturing processes with unidirectional prepreg preforms.

Different Number of Components Example

The maximum allowable number of components K (i.e., the maximum allowable number of discrete orientations), is an input to the optimization. This section discusses the effect of setting different values of K on the optimization results.

FIGS. 15A-15D show the optimized multi-component topologies with K equals to 1 to 4, respectively. The case of K=3 is also shown in FIG. 1, as described above.

The structural compliance improves as the maximum allowable number of discrete orientations increases. Their optimized compliance values are 9.92, 6.76, 6.21, and 5.83 for K=1, K=2, K=3, and K=4 respectively. Similar to the curvilinear study, the overall base topology adapts to different settings of K. With the increase of K, the base topology becomes rather similar to that of the optimized single-piece topology with an isotropic material in FIG. 13A.

From the economics perspective, the fewer number of orientations will usually lead to less production cost in large quantities due to the reduced customization of unidirectional fiber fabrics, and the reduced labor cost on manual prepreg preform layups.

In summary, Table 2 compares the optimized structural performances for all numerical examples discussed above. The optimized single-piece topology with an isotropic material, assuming randomly oriented discontinuous short fibers, yields the worst structural performance. The optimized single-piece topology with the continuous material orientation based on Nomura et al. yields the best structural performance, followed by the optimized multi-component topology with curvilinear material orientations, and then the optimized multi-component topologies with different numbers of unidirectional material orientations. Though their production costs are not quantitatively modeled, the qualitative estimations are also listed in Table 2, which illustrate the trade-off between structural performance and mass production cost.

TABLE 2

Summary of the structural performance and estimated mass-production cost of cantilever designs discussed above.

| | Isotropic | MTO K = 1 | MTO K = 2 | Unidirectional K = 3 | K = 4 | MTO curv | Continuous |
|---|---|---|---|---|---|---|---|
| Compliance | 9.92 | 9.27 | 6.75 | 6.21 | 5.83 | 5.65 | 4.07 |
| Cost | low | med | med | med | med | med+ | high |

Multi-Load Tandem Bicycle Frame Example

Figure 16:
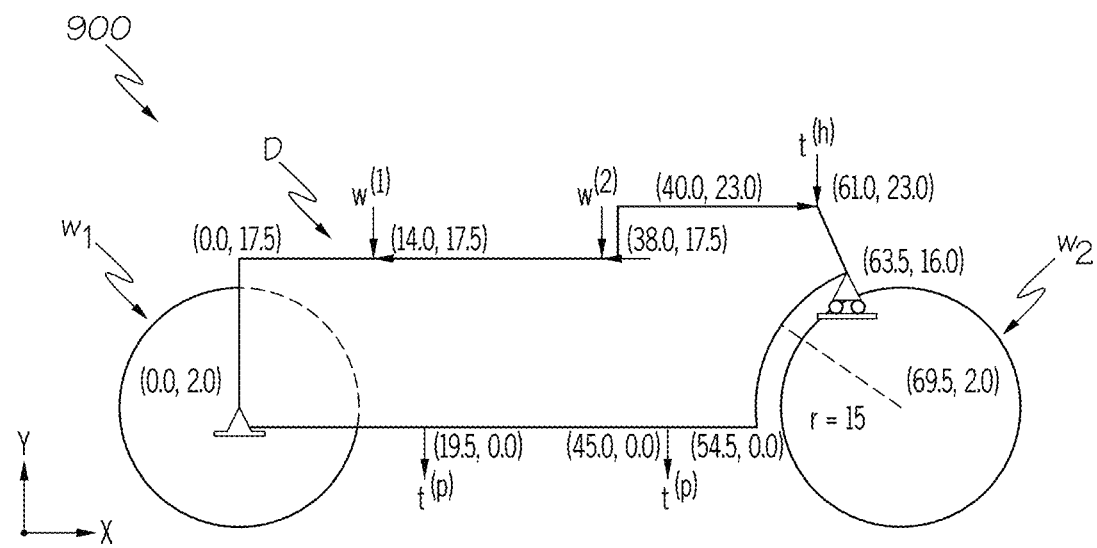
FIG. 16 schematically illustrates design domain and boundary conditions for a multi-load tandem bicycle frame example.

This example presents the design of a tandem bicycle frame providing a multi-load problem depending on whether the heavier rider is sitting in the front or in the rear, which is very suitable for testing anisotropic topology optimization. FIG. 16 shows the design domain and boundary conditions of the simplified tandem bicycle frame example. The design domain is discretized with 11052 free irregular quadrilateral elements. The example assumes that an adult and a child will be riding the bicycle. Depending on who is sitting in the front, there are two loading conditions. Each load is applied and solved independently. The objective for the multi-load problem is formulated as follows:

$$F_m = F_1 + F_2, \quad (21)$$

where $F_m$ is the multi-load objective function; $F_1$ and $F_2$ are structural compliances for the two loading conditions.

In FIG. 16, $t_x^{(p)} = -1.5$; $t_y^{(p)} = -1.0$; $t_x^{(h)} = 1.0$; $t_y^{(h)} = -1.5$; $w_x = \{-1.0, 0.25\}$; and $w_y = \{-6.0, 1.5\}$. At location (0.0, 2.0), both degrees of freedom in x and y are fixed. At location (63.5, 16.0), only the degree of freedom in y is fixed. The lower left corning of the design domain is set as location (0.0, 0.0).

Figure 17A:
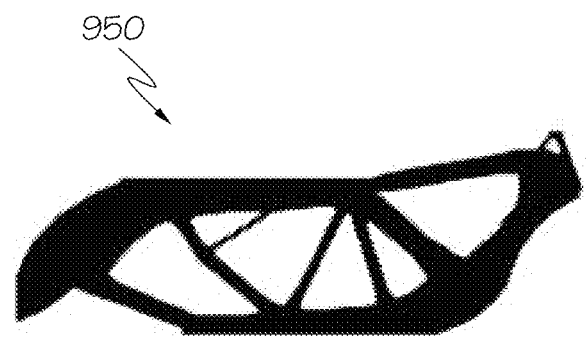
FIG. 17A illustrates an optimized single-piece tandem bicycle frame structure with an isotropic material.
Figure 17B:
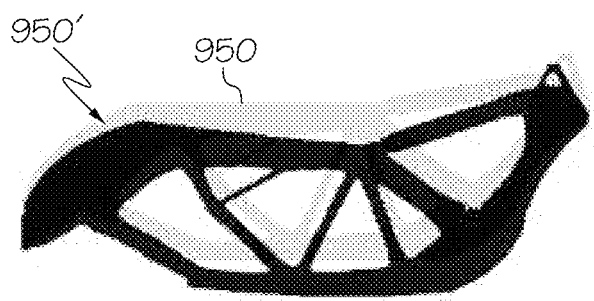
FIG. 17B illustrates the optimized single-piece tandem bicycle frame structure illustrated by FIG. 17A under a heavy front loading condition.
Figure 17C:
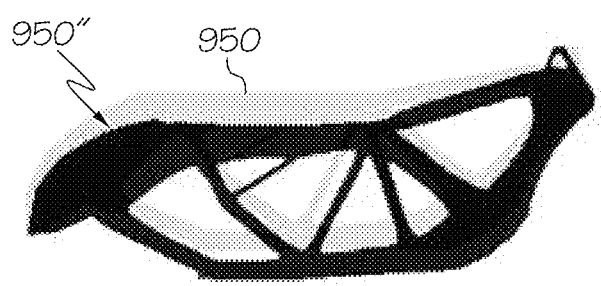
FIG. 17C illustrates an optimized single-piece tandem bicycle frame structure illustrated by FIG. 17A under a heavy rear loading condition.

FIGS. 17A-17C presents the benchmark isotropic single-piece topology design 950 assuming randomly oriented discontinuous short fibers with a resulting compliance value of 4952. FIG. 17A shows the topology design 950 with no-loading. FIG. 17B shows the topology design 950' with heavy front-loading. FIG. 17C shows the topology design 950" with heavy rear loading.

Figure 18A:
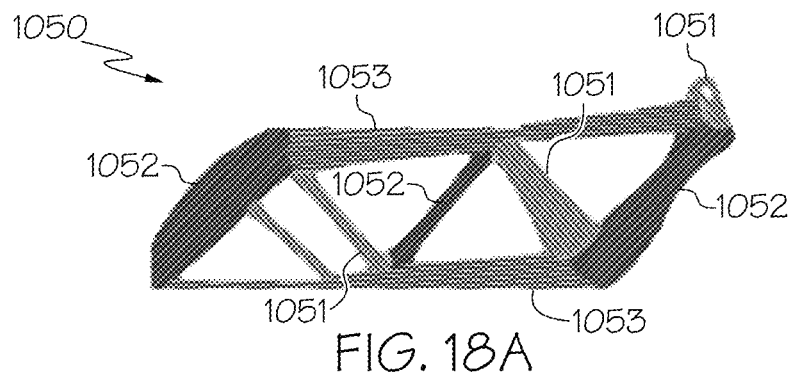
FIG. 18A illustrates an optimized topology of an optimized multi-component tandem bicycle frame structure with component-wise unidirectional material orientations.
Figure 18B:
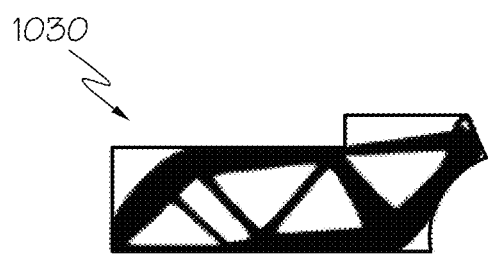
FIG. 18B illustrates an optimized density field for the topology illustrated by FIG. 18A.
Figure 18C:
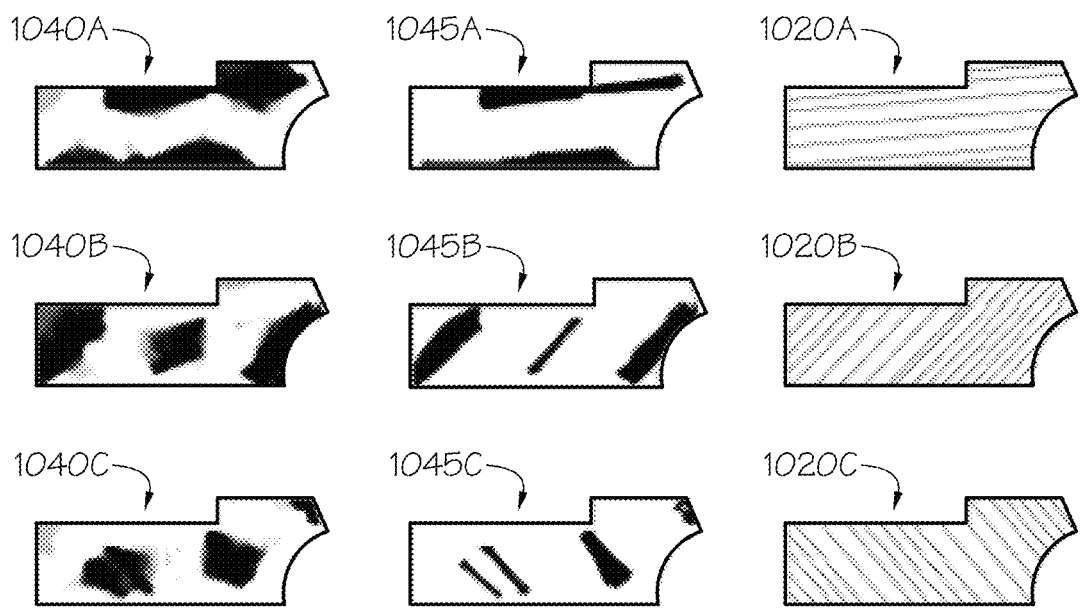
FIG. 18C illustrates the optimized membership field, the optimized component field, and the optimized material orientation field for three components of the topology illustrated by FIG. 18A.

FIG. 18A illustrates an optimized multi-component topology design 1050 with the material orientation design. It comprises a first component 1051, a second component 1052 and a third component 1053. FIG. 18B illustrates the optimized density field ρ 1030. In FIG. 18C, a first component membership field $m^{(k)}$ 1040A, a first optimized component field (product of the optimized density field ρ and the first component membership field $m^{(k)}$) $\rho m^{(k)}$ 1045A, and a first optimized material orientation field $\vartheta^{(k)}$ 1020A of the first component 1051 is illustrated. A second component membership field $m^{(k)}$ 1040B, a second optimized component field (product of the optimized density field ρ and the second component membership field $m^{(k)}$) $\rho m^{(k)}$ 1045B, and a second optimized material orientation field $\vartheta^{(k)}$ 1020B of a second component is also illustrated. A third component membership field $m^{(k)}$ 1040C, a third optimized component field (product of the optimized density field ρ and the third component membership field $m^{(k)}$) $\rho m^{(k)}$ 1045C, and a third optimized material orientation field $\vartheta^{(k)}$ 1020C of a third component 1053 is also illustrated.

For the anisotropic multi-component topology design, K is set as 3, and the unidirectional fiber orientation is enforced for each component by setting the orientation filter radius larger than the size of the design domain. As we have seen in previous results, the overall base topology is different from that of the isotropic case. The optimized unidirectional fiber orientations mostly align the longitudinal directions of beam-like substructures. The optimized multi-load compliance for the multi-component case is 3312, which is more than 30% improvement over the benchmark isotropic design.

It should now be understood that embodiments of the present disclosure are directed to topology optimization methods for structures made of multiple composite components (substructures) with tailored material orientations. Embodiments are capable of simultaneously optimizing the overall topology, component partitioning, and unidirectional (or curvilinear) material orientation for each component. A vector field variable is introduced to represent fractional membership to each component. A cube-to-simplex projection and penalization scheme was developed to solve general multi-component topology optimization problems. Through the integration with a continuous material orientation design method, embodiments are capable of generating multi-component composite structures with tailored material orientations for each component, without a prescribed set of alternative discrete angles. The outcome is a unique composite structural design solution that could not be accomplished by either existing continuous or discrete material orientation methods, and would be most suitable for economical composite manufacturing processes.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of designing a structure by computer-implemented topology optimization, the method comprising:
   establishing, by one or more processors, a plurality of design points within a design domain;
   establishing, by the one or more processors:
     at least a first orientation field and a second orientation field, wherein values of the first orientation field and the second orientation field correspond to an orientation angle of an element;
     one or more membership fields, wherein the one or more membership fields is associated with membership within a first component of the structure and a second component of the structure; and
     one or more density fields;
   assigning, for each individual design point of the plurality of design points, values for the one or more membership fields, the one or more density fields, the first orientation field and the second orientation field;
   projecting the values onto a simulation model after multiplying the values of the orientation fields and the one or more density fields by the values of the one or more membership fields; and
   achieving convergence of an objective function for a design variable by iteratively executing a topology optimization of the simulation model using the values, wherein:
     convergence results in design of the structure, and
     each design point of the plurality of design points is a member of no component or a member of one of the first component and the second component such that a shape of the first component and a shape of the second component are determined based on the one or more membership fields.

2. The method of claim 1, wherein:
   the one or more membership fields comprises at least a first membership field and a second membership field, wherein the first membership field is associated with membership within the first component of the structure and the second membership field is associated with membership within the second component of the structure; and
   the one or more density fields comprises at least a first density field and a second density field.

3. The method of claim 1, wherein:
   the one or more membership fields is a common membership field having at least three possible values such that a zero membership value indicates no membership within the first component or the second component, a first membership value indicates membership within the first component, and a second membership value indicates membership within the second component; and
   the one or more density fields is a common density field.

4. The method of claim 1, wherein:
the one or more membership fields comprises at least a first membership field and a second membership field, wherein the first membership field is associated with membership within the first component of the structure and the second membership field is associated within membership within the second component of the structure; and
the one or more density fields is a common density field.

5. The method of claim 1, wherein:
the one or more membership fields is a common membership field having at least three possible values such that a zero membership value indicates no membership within the first component or the second component, a first membership value indicates membership within the first component, and a second membership value indicates membership within the second component; and
the one or more density fields comprises at least a first density field and a second density field.

6. The method of claim 5, further comprising establishing one or more additional membership fields, one or more additional density fields, and one or more additional orientation fields.

7. The method of claim 1, wherein the values are updated after each iteration of execution of the topology optimization of the simulation model.

8. The method of claim 1, wherein the design variable is compliance.

9. The method of claim 1, wherein the element is a fiber.

10. A method of designing a structure by computer-implemented topology optimization, the method comprising:
establishing, by one or more processors, a plurality of design points within a design domain;
establishing, by the one or more processors:
at least a first membership field and a second membership field, wherein the first membership field is associated with membership within a first component of the structure and the second membership field is associated within membership within a second component of the structure;
at least a first density field and a second density field; and
at least a first orientation field and a second orientation field, wherein values of the first orientation field and the second orientation field correspond to an orientation angle of an element;
assigning, for each individual design point of the plurality of design points, values for the first membership field, the second membership field, the first density field, the second density field, the first orientation field and the second orientation field;
projecting the values onto a simulation model after multiplying the values of the orientation fields and the density fields by the values of the membership fields; and
achieving convergence of an objective function for a design variable by iteratively executing a topology optimization of the simulation model using the values, wherein:
convergence results in design of the structure, and
each design point of the plurality of design points is a member of no component or a member of one of the first component and the second component such that a shape of the first component and a shape of the second component are determined based on the one or more membership fields.

11. The method of claim 10, further comprising establishing one or more additional membership fields, one or more additional density fields, and one or more additional orientation fields.

12. The method of claim 10, wherein the values are updated after each iteration of execution of the topology optimization of the simulation model.

13. The method of claim 10, wherein values for the first density field, the second density field, the first orientation field and the second orientation field for each individual design point are filtered by the first membership field and the second membership field.

14. The method of claim 13, wherein, for each individual design point of the plurality of design points:
values for the first density field and the first orientation field are projected onto the simulation model only when the value for the first membership field is equal to one; and
values for the second density field and the second orientation field are projected onto the simulation model only when the value for the second membership field is equal to one.

15. The method of claim 10, wherein the design variable is compliance.

16. The method of claim 10, wherein the element is a fiber.

17. A method of designing a structure by computer-implemented topology optimization, the method comprising:
establishing, by one or more processors, a plurality of design points within a design domain;
establishing, by the one or more processors:
a common membership and density field, wherein values of the common membership and density field are associated with membership within one or more components of the structure and density values within the structure; and
at least a first orientation field and a second orientation field, wherein values of the first orientation field and the second orientation field correspond to an orientation angle of an element;
assigning, for each individual design point of the plurality of design points, values for the common membership and density field, the first orientation field and the second orientation field;
projecting the values onto a simulation model after multiplying the values of the orientation fields by the values of the common membership and density field; and
achieving convergence of an objective function for a design variable by iteratively executing a topology optimization of the simulation model using the values, wherein:
convergence results in design of the structure, and
each design point of the plurality of design points is a member of no component or one of the one or more components such that a shape of a first component and a shape of a second component are determined based on the one or more membership fields.

18. The method of claim 17, wherein:
an individual design point having a value of the common membership and density field of zero is a member of no component;

an individual design point having a value of the common membership and density field that is within a first range is a member of the first component of the one or more components; and an individual design point having a value of the common membership and density field that is within a second range is a member of the second component of the one or more components.

19. The method of claim 18, wherein a density value for an individual design point is a fraction of the value for the common membership and density field.

20. The method of claim 17, wherein the element is a fiber.

* * * * *